(12) United States Patent
Zheng et al.

(10) Patent No.: US 12,011,030 B2
(45) Date of Patent: Jun. 18, 2024

(54) METHOD FOR EVALUATING CIGARETTE BURNING QUALITY INDICATORS

(71) Applicant: CHINA TOBACCO YUNNAN INDUSTRIAL CO., LTD., Kunming (CN)

(72) Inventors: Han Zheng, Kunming (CN); Jianbo Zhan, Kunming (CN); Hao Wang, Kunming (CN); Zhenhua Yu, Kunming (CN); Xu Wang, Kunming (CN); Jiao Xie, Kunming (CN); Ying Zhang, Kunming (CN); Tao Wang, Kunming (CN); Tingting Yu, Kunming (CN); Baoshan Yue, Kunming (CN)

(73) Assignee: China Tobacco Yunnan Industrial Co., Ltd., Kunming (CN)

( * ) Notice: Subject to any disclaimer, the term of this patent is extended or adjusted under 35 U.S.C. 154(b) by 0 days.

(21) Appl. No.: 18/504,248

(22) Filed: Nov. 8, 2023

(65) Prior Publication Data
US 2024/0122229 A1  Apr. 18, 2024

Related U.S. Application Data

(63) Continuation of application No. PCT/CN2023/097779, filed on Jun. 1, 2023.

(51) Int. Cl.
*A24C 5/34* (2006.01)
*G01J 3/02* (2006.01)
*G01N 21/84* (2006.01)

(52) U.S. Cl.
CPC ............ *A24C 5/3406* (2013.01); *G01N 21/84* (2013.01); *G01J 3/0248* (2013.01); *G06T 2207/30108* (2013.01)

(58) Field of Classification Search
CPC ........ A24D 1/02; A24D 1/025; A24B 15/282; A24C 5/3406; G01N 21/84; G01J 3/0248; G06T 2207/30108
See application file for complete search history.

(56) References Cited

U.S. PATENT DOCUMENTS 5,220,930 A * 6/1993 Gentry ................. A24D 1/02
                                                        131/365
2004/0134631 A1* 7/2004 Crooks ................. A24D 1/025
                                                        131/365

(Continued)

FOREIGN PATENT DOCUMENTS

CN    106022650 A    10/2016
CN    109242362 A     1/2019

(Continued)

OTHER PUBLICATIONS

Written Opinion dated Aug. 9, 2023; International Application No. PCT/CN2023/097779; International Filing Date Jun. 1, 2023; 3 pages; China National Intellectual Property Administration (ISA/CN), Beijing, China.

*Primary Examiner* — Mohammad K Islam
(74) *Attorney, Agent, or Firm* — Andrew D. Fortney; Central California IP Group, P.C.

(57) ABSTRACT

A method for comprehensively analyzing and/or evaluating cigarette burning quality index is disclosed. The steps include collecting cigarette burning quality index data, filtering the cigarette burning quality index data, standardizing cigarette data, and measuring cigarette burning quality. The importance of the cigarette burning quality indicators can also be evaluated. The method for comprehensively analyzing and/or evaluating cigarette burning quality indicators can reflect general laws more accurately by maintaining the sample distribution through a singularity detection method, and analyzing correlations of each index with cigarette (Continued)

performance from multiple perspectives, to fuse them into a comprehensive measurement value. The importance ranking and weight of indicators can be obtained more completely and stably.

9 Claims, 1 Drawing Sheet

(56) References Cited

U.S. PATENT DOCUMENTS

| | | | |
|---|---|---|---|
| 2009/0301506 A1* | 12/2009 | Kida | A24D 1/02 131/365 |
| 2015/0078654 A1 | 3/2015 | Chaudhury et al. | |
| 2017/0238603 A1* | 8/2017 | Papakyrillou | A24D 1/045 |
| 2018/0271143 A1* | 9/2018 | Besso | A24D 1/025 |
| 2020/0275688 A1* | 9/2020 | Rousseau | A24B 15/42 |
| 2020/0329758 A1* | 10/2020 | Bonici | A24D 3/14 |
| 2021/0123847 A1* | 4/2021 | Xiong | G01N 15/0205 |
| 2023/0210165 A1* | 7/2023 | Rose | A24C 5/005 131/365 |
| 2023/0265615 A1* | 8/2023 | Zhang | A24C 5/005 162/135 |

FOREIGN PATENT DOCUMENTS

| | | |
|---|---|---|
| CN | 110458474 A | 11/2019 |
| CN | 113252839 A | 8/2021 |

\* cited by examiner

METHOD FOR EVALUATING CIGARETTE BURNING QUALITY INDICATORS

CROSS-REFERENCE TO RELATED APPLICATIONS

This application is a continuation of International Pat. Appl. No. PCT/CN2023/097779, filed on Jun. 1, 2023, which claims the benefit of Chinese Pat. Appl. No. 202210795866.0, filed on Jul. 7, 2022, both of which are incorporated herein by reference as if fully set forth herein.

TECHNICAL FIELD

The present invention relates to the field of analysis of cigarette burning quality indicators, and specifically concerns a method of comprehensively analyzing cigarette burning quality indicators and identifying the importance of certain ones of the quality indicators.

BACKGROUND

With the rapid development of the tobacco industry and the improvement of economic levels, tobacco products are developing towards diversification and high quality. The emergence of e-cigarettes has reduced the consumption of traditional paper cigarettes to a certain extent, but it still cannot replace traditional paper cigarettes. Therefore, the long-term demand for traditional cigarettes exists, but at the same time, consumers have more stringent and detailed quality requirements for all aspects of cigarettes.

Consumers' evaluation of cigarettes mainly starts from vision and smell, with vision accounting for a large proportion. There are many aspects of cigarette performance that consumers can observe during smoking, such as ash, cracks, charcoal lines, etc., and each part also has several measurement indicators for analysis, such as color, shape, etc. However, the existence of many indicators can facilitate development of objective evaluation criteria for the importance of each quality indicator. With the development of the field of data science, analysis of various cigarette quality indicators by data mining has become a new and in-depth research direction.

SUMMARY

The present invention aims to solve the above-mentioned problems.

In order to promote the application of data mining to cigarette burning evaluation, the present invention provides a method of comprehensively analyzing and/or evaluating cigarette burning quality indicators and their relative importance. The analysis process includes two parts: (1) detecting cigarette sample outliers and (2) analyzing cigarette burning index measurements, wherein:

Detecting cigarette sample outliers comprises identifying sample points with low density and that are relatively distant from high-density groups (e.g., using an isolated forest method of data analysis). It aims to provide a reference for outlier samples. If there are high requirements for data distribution, one may reasonably eliminate those data/sample points that are too far away (e.g., more than a threshold different from the high-density groups).

Analyzing cigarette burning indicator measurements uses different inspection angles to calculate a grayscale correlation, a Euclidean distance, a city block distance and cosine distance between or among the indicators, and enables constructing a comprehensive correlation measure to obtain information such as indicator importance and inter-indicator correlation(s).

In order to achieve the above objects, the following technical solutions are disclosed:

Specifically, the present invention provides a method for comprehensively analyzing and/or evaluating cigarette burning quality indicators and optionally identifying the importance of certain ones of the quality indicators, which includes the following steps:

S1. Collecting cigarette burning quality indicator data. While simulating smoking using a robot under predefined environmental simulation conditions, capturing real-time status (e.g., collecting data for each of the cigarette burning quality indicators) of cigarettes at different angles using a plurality of cameras. The indicators may include crack rate, ash column deviation, fly ash value, ash retention rate, charcoal line uniformity, charcoal line width, burning speed, ash column gray level, ash column length, ash column area and ash shrinkage rate.

Simulating arm and wrist movements of smokers when smoking using a plurality of multi-axis industrial manipulators configured to clamp or hold the cigarettes. The movement speed and angle of the manipulators are adjustable within a certain range. The action of flicking cigarette ash is simulated by applying a force with mechanical fingers (e.g., of one or more of the multi-axis industrial manipulators), in which the intensity, interval and number of times are adjustable within a certain range. The method may further simulate the smoking process using a suction device having a suction mode, a suction time, a suction volume, and a suction interval that are adjustable within a certain range. The data are collected using one or more cameras (e.g., a plurality of high-speed precision smart cameras with a resolution of 1600*1200 dots per square inch [dpi] or higher and a frame rate of 50 frames per second [fps] or above).

The collected cigarette burning quality indicators include: crack rate, ash column deviation, ash column gray level, ash column length, ash column area, ash shrinkage rate, fly ash value, ash retention rate, charcoal line width, charcoal line uniformity and burning speed, a total of 11 indicators.

To collect cigarette burning quality indicator data, common existing equipment and methods can be used. Of course, it is more preferable to use a robotic arm that simulates the entire process of human cigarette smoking to capture the real-time smoking status (e.g., indicator data) of the cigarette through a camera system and collect the external attributes of the cigarette. Among them, a robotic arm that simulates the human cigarette smoking process and smoking environment can be found in Chinese Pat. Application No. 202010329623.9, filed by China Tobacco Yunnan Industrial Co., Ltd. on Apr. 20, 2020, entitled "Machine that simulates the entire process of human cigarette smoking" and disclosing the arm and its simulation method. Alternatively, a method of using the robotic arm to collect the external attributes of cigarettes can be found in Chinese Pat. Application No. 202010340747.7, filed by China Tobacco Yunnan Industrial Co., Ltd. on Apr. 26, 2020, entitled "Robot-based method for simulating the entire process of human cigarette smoking and a method for fully visual measurement to characterize the ash burning performance of cigarettes." The technical solutions of these two patent applications on the measurement method(s), the mechanical arm(s), and cigarette pack ash performance are incorporated herein by reference.

The above-mentioned cigarette burning quality indicators have the following meanings. The crack rate is the ratio of the area of ash pieces falling or cracking on the ash column to the overall surface area of the ash column. The ash column deviation refers to the maximum distance between the ash column of the cigarette and the axis of the cigarette filter rod. The deviation angle has its ordinary meaning to those skilled in the art. The ash column grayscale value reflects the relative color difference of the remaining (e.g., unburned) part of the cigarette except for the crack after burning in the same reference system. The larger the ash column grayscale value, the whiter the ash column. The ash column length is the length of the ash column formed after the cigarette is burned. The ash column area is the width or cross-sectional area of the ash column formed after the cigarette is burned. The ash shrinkage rate is the ratio of the ash column area after the cigarette is burned to the unburned area. The fly ash value is the area of ash scattered outside a fixed ash point. The ash rate is the ratio of the longest value of the ash column that can be maintained during the cigarette burning process to the length of the cigarette from burning to the butt. The charcoal line width is the width of the charcoal line at the bottom of the cigarette's burning cone. The charcoal line uniformity refers to the bottom of the cigarette's burning cone. The maximum deviation angle refers to the angle between the charcoal line and the cross-section of the cigarette. The burning speed is the ratio of the burned length of the cigarette to the amount of time for that length of the cigarette to burn.

The initial measured values of the sample of the above cigarette burning quality indicators can be expressed by $X_{og}=(x_{1og}, x_{2og}, \ldots, x_{11og})$, where $x_{1og}, x_{2og}, \ldots, x_{11og}$ respectively represent the initial measured values of the burning quality indicators of the sample.

S2. Filtering cigarette burning quality index data. Finding or identifying samples having data that are sparsely distributed and far away from high-density groups of data, for example using an isolation forest method (e.g., of detecting data anomalies). A random segmentation strategy may also be used to control a path length that different samples undergo when they are isolated, thereby identifying outlier singular points (e.g., of data).

Building a subsample isolated tree, in which each node of the tree is a leaf node or an intermediate node with two child nodes. Randomly select indicators and split $X_{og}$ values to perform recursive splits. For each split implementation, samples smaller than the split value are assigned to a left sub-node (e.g., of the subsample isolated tree), and samples larger than the split value are assigned to a right sub-node (e.g., of the subsample isolated tree). The isolated tree is constructed until all samples are isolated or the tree reaches a specified height. The number of sub samples $\psi$ and tree height $h_t$ may satisfy the following relationship:

$$h_t = \text{ceiling}(\log_2(\psi));$$

where $h_t$ is the smallest integer value greater than or equal to $\log_2(\psi)$. It is approximately equal to the average path length of the tree:

$$c(m) = 2H(m-1) - \frac{2(m-1)}{m};$$

where m is the number of samples, c(m) is the average path length of the tree (that is, the average height of the tree), H(m−1) is a harmonic number (e.g., of the tree), and its estimated value is ln(m−1)+0.577. The number of sub-samples $\psi$ may be 256.

To construct an isolated forest, the number of trees contained in it is $c_t$, and this invention may take $c_t=100$. By passing the test sample through each isolated tree in the isolation forest, an anomaly score of each sample can be obtained. The anomaly score of sample x is calculated according to the following formula:

$$s(x, m) = 2^{-\frac{E(h(x))}{c(m)}};$$

where h(x) is the path length of sample x, and E(h(x)) is the expectation of h(x). The value range of the anomaly score of the sample is (0,1). The smaller the sample path length h(x) is, the closer the anomaly score is to 1 and the higher the singular probability is. The larger the sample path length h(x) is, the closer the anomaly score is to 0 and the lower the singular probability is. For samples with high abnormality scores, a reasonable selection can be made based on the actual situation and data requirements. The retained data after removing the singular (e.g., anomalous) samples is denoted as:

$$X_{norm}=(x_{1norm}, x_{2norm}, \ldots, x_{11norm}).$$

S3. Standardizing cigarette data to eliminate dimensional differences in different burning quality indicators. The cigarette burning quality indicators can be divided into positive indicators and negative indicators. Positive indicators mean that the larger the value is, the better the performance is. Positive indicators include ash column grayscale, ash column length, ash column area, and ash retention rate. Negative indicators mean that the smaller the value is, the better the performance is. Negative indicators include crack rate, ash column deviation, fly ash value, charcoal line width, charcoal line uniformity and burning speed.

Standardization may be achieved through a two-way range, and the positive indicators are processed as follows:

$$x_i = \frac{x_{inorm} - \min(x_{inorm})}{\max(x_{inorm}) - \min(x_{inorm})}, i = 1, 2, \ldots, 11;$$

The negative indicators are processed as follows:

$$x_i = \frac{\max(x_{inorm}) - x_{inorm}}{\max(x_{inorm}) - \min(x_{inorm})}, i = 1, 2, \ldots, 11;$$

where $X=(x_1, x_2, \ldots, x_{11})$ is the cigarette burning quality data (e.g., standard cigarette burning quality data), and $\max(x_{inorm})$ and $\min(x_{inorm})$ are respectively the maximum and minimum values of each indicator of the retained data after removing singular or anomalous samples or data in step S2.

S4. Measuring comprehensive cigarette burning quality: combining the grayscale correlation, the Euclidean distance, the city block distance and the cosine similarity data or analysis to obtain a complete quantitative result of the burning quality indices, their measurement, and optionally their importance. The grayscale correlation, the Euclidean distance, the city block distance and the cosine similarity may be sample performance correlation analyses.

Grayscale correlation analysis measures the correlation between each indicator and sample performance through the similarity of the development trends of different indicators.

The gray correlation coefficient X between the cigarette burning quality index and the cigarette sample performance reference column is:

$$\zeta i(k) = \frac{\min_s\min_t|x_0(t) - x_s(t)| + \rho\max_s\max_t|x_0(t) - x_s(t)|}{|x_0(k) - x_i(k)| + \rho\max_s\max_t|x_0(t) - x_s(t)|};$$

Among them, $\zeta i(k)$ is the grayscale correlation coefficient, $\rho$ is a resolution coefficient that may be used to weaken an excessive impact of the maximum value on the grayscale correlation coefficient, and optionally, where $\rho=0.5$;

$$\min_s\min_t|x_0(t) - x_s(t)|$$

is the two-level minimum difference, and $$\min_s\min_t|x_0(t) - x_s(t)|$$

is the two-level maximum difference. The grayscale correlation value of the evaluation sample and performance reference column is obtained by:

$$d_r = \frac{1}{n}\sum_{k=1}^{n}\zeta_i(k);$$

Measuring the degree of distance correlation on an invariant scale via the Euclidean distance. The Euclidean distance between the cigarette burning quality index and the cigarette sample performance reference column is:

$$d_e = \sqrt{\sum_{i=1}^{n}(x_i - x_0)^2};$$

Dimensionally, distance correlation is measured through the city block distance. The city block distance between the cigarette burning quality index and the cigarette sample performance reference column is:

$$d_c = \sum_{i=1}^{n}|x_i - x_0|;$$

Starting from the angle between multi-dimensional space vectors, the degree of directional correlation is reflected through the cosine similarity. The cosine similarity between the cigarette burning quality index and the cigarette sample performance reference column is:

$$d_{cos} = 1 - \frac{X \cdot x_0}{\|X\| \times \|x_0\|} = 1 - \frac{\sum_{i=1}^{n}x_i \times x_0}{\sqrt{\sum_{i=1}^{n}x_i^2} \times \sqrt{\sum_{i=1}^{n}x_0^2}};$$

The above burning quality indicators and sample performance correlation analyses are measured from different starting points, and they are irreplaceable for each other. The four metrics are combined according to the following formula:

$$d = \frac{d_r - \min(d_r)}{(\max(d_r) - \min(d_r))} + \sum_{i=1}^{2}\frac{\frac{1}{d_i} - \min\left(\frac{1}{d_i}\right)}{2\left(\max\left(\frac{1}{d_i}\right) - \min\left(\frac{1}{d_i}\right)\right)} + \frac{\frac{1}{d_{cos}} - \min\left(\frac{1}{d_{cos}}\right)}{\left(\max\left(\frac{1}{d_{cos}}\right) - \min\left(\frac{1}{d_{cos}}\right)\right)}$$

Among them, d is the comprehensive measure, $d_r$ is a grayscale correlation degree; when i=1, 2, $d_1$ and $d_2$ represent the Euclidean distance and city block distance respectively, and $d_{cos}$ represents the cosine similarity. One can calculate the comprehensive measure of each indicator and/or correlation analysis, and obtain an importance or ranking of the corresponding cigarette burning quality indicators. According to the comprehensively measured value, one can determine a weight for various ones of the cigarette burning quality indicators.

Due to the adoption of the above technical solutions, the present invention has the following beneficial effects compared with the prior art:

Aiming at the issue of importance evaluation of cigarette burning quality indicators, the method of comprehensively analyzing and/or evaluating the cigarette burning quality indicators and optionally their importance using the present invention can maintain the sample distribution through singular detection methods, more accurately reflect universal laws, and evaluate the cigarette burning quality from multiple perspectives. Correlation analysis is conducted between each indicator and cigarette performance (e.g., as conducted by simulation using appropriate robots), and finally integrated into a comprehensive measurement value, which can obtain a more complete and stable indicator importance ranking and weight.

These and other advantages of the present invention will become readily apparent from the detailed description of various embodiments below.

DETAILED DESCRIPTION

Figure 1:
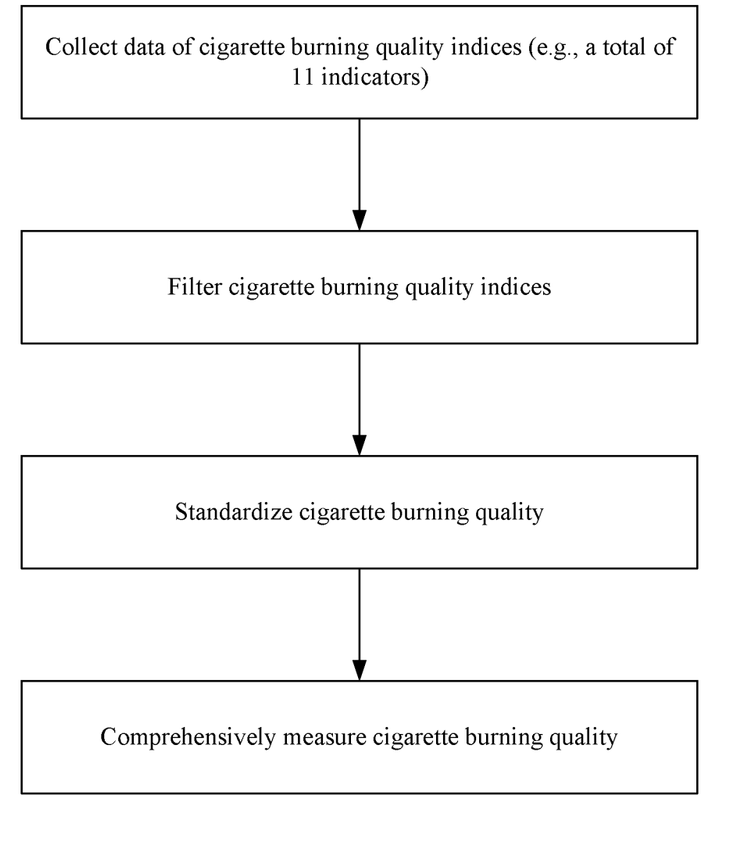
FIG. 1 is an exemplary flow chart of the present method.

The present invention will be further described in detail below in conjunction with the accompanying drawings and specific embodiments:

The invention provides a method for comprehensively analyzing and/or evaluating cigarette burning quality indicators and their importance, and enables standardization of the collected cigarette burning quality data. The processed cigarette burning quality data can reflect the distribution patterns and characteristics of most samples. Then, the cigarette burning quality indicators are comprehensively measured through several correlation examination methods from different angles, and finally the importance and/or ranking of each indicator may be obtained.

In order to achieve the above objects, the present invention may include one or more of the following technical solutions:

Specifically, the present invention provides a method for comprehensively analyzing and/or evaluating the importance of cigarette burning quality indicators, which includes the following steps:

S1. Collecting cigarette burning quality index or indicator data. While simulating smoking using a robot under pre-defined environmental simulation conditions, capturing real-time status (e.g., collecting data for each of the cigarette burning quality indicators during simulated smoking) of cigarettes at different angles using a plurality of cameras at different angles. The indices or indicators may include crack rate, ash column deviation, ash column gray level, ash column length, ash column area, ash shrinkage rate, fly ash value, ash retention rate, charcoal line width, charcoal line uniformity, and burning speed.

Two sets of multi-axis industrial manipulators clamp or hold the cigarettes to simulate the arm and wrist movements of smokers when smoking. The movement speed and angle of the manipulators are adjustable within a certain range. The action of flicking cigarette ash may be simulated by applying a force with mechanical fingers (e.g., of one or more of the multi-axis industrial manipulators), and the intensity, interval, and number of times (e.g., of applying the force) are adjustable within a certain range. A suction or vacuum device further simulates the smoking process, in which the suction mode, the suction time, the suction volume, and the suction interval (e.g., length of time between application of suction or a vacuum to the burning cigarette) are adjustable within a certain range. Data is collected using one or more cameras, such as a high-speed precision smart camera set with a resolution of 1600*1200 dpi or higher and a frame rate of 50 fps or greater.

The collected cigarette burning quality indicators may include: crack rate, ash column deviation, ash column gray level, ash column length, ash column area, ash shrinkage rate, fly ash value, ash retention rate, charcoal line width, charcoal line uniformity and burning speed.

The above-mentioned cigarette burning quality indicators have the following meanings. The crack rate is the ratio of the area of ash pieces falling or cracking on the ash column to the overall surface area of the ash column. The ash column deviation refers to the maximum distance between the ash column of the cigarette and the axis of the cigarette filter rod. The deviation angle has its ordinary meaning to those skilled in the art. The ash column grayscale value reflects the relative color difference of the remaining (e.g., unburned) part of the cigarette except for the crack after burning in the same reference system. The larger the ash column grayscale value, the whiter the ash column. The ash column length is the length of the ash column formed after the cigarette is burned. The ash column area is the width or cross-sectional area of the ash column formed after the cigarette is burned. The ash shrinkage rate is the ratio of the ash column area after the cigarette is burned to the unburned area. The fly ash value is the area of ash scattered outside a fixed ash point. The ash rate is the ratio of the longest value of the ash column that can be maintained during the cigarette burning process to the length of the cigarette from burning to the butt. The charcoal line width is the width of the charcoal line at the bottom of the cigarette's burning cone. The charcoal line uniformity refers to the bottom of the cigarette's burning cone. The maximum deviation angle between the charcoal line and the cross section of the cigarette. The burning speed is the ratio of the burned length of the cigarette to the amount of time for that length of the cigarette to burn.

The initial measurement value of the cigarette burning quality index is represented by $X_{og}=(x_{1og}, x_{2og}, \ldots, x_{11og})$, wherein $x_{1og}, x_{2og}, \ldots, x_{11og}$ represent the initial measurement values of the burning quality indices (up to a total of 11 indices) of the cigarette samples, respectively.

In one example, data from simulated smoking of 390 conventional circumferential or cylindrical cigarette samples were collected. The original data collected are shown in Table 1, where: $x_{1og}$ is the crack rate, $x_{2og}$ is the ash column deviation, $x_{3og}$ is the ash column grayscale value, $x_{4og}$ is the charcoal line width, $x_{5og}$ is the ash column length, $x_{6og}$ is the ash column area, $x_{7og}$ is the ash shrinkage rate, $x_{8og}$ is the charcoal line uniformity, $x_{9og}$ is the burning speed, $x_{10og}$ is the fly ash value, and $x_{11og}$ is the ash retention rate.

TABLE 1

Example sample burning quality data collection values

| Sample | $x_1$ | $x_2$ | $x_3$ | $x_4$ | $x_5$ | $x_6$ | $x_7$ | $x_8$ | $x_9$ | $x_{10}$ | $x_{11}$ |
|---|---|---|---|---|---|---|---|---|---|---|---|
| 1 | 8.40 | 20.03 | 142.36 | 0.95 | 30.38 | 190.97 | 70.43 | 1.67 | 5.33 | 3.94 | 81.50 |
| 2 | 9.61 | 3.48 | 142.97 | 0.89 | 32.09 | 200.23 | 71.84 | 1.65 | 5.54 | 11.28 | 83.93 |
| 3 | 9.85 | 19.85 | 143.52 | 0.93 | 31.21 | 201.04 | 72.02 | 1.84 | 5.51 | 15.22 | 81.31 |
| 4 | 3.84 | 6.10 | 150.70 | 0.82 | 30.93 | 190.92 | 71.89 | 1.37 | 5.38 | 8.34 | 81.34 |
| 5 | 10.00 | 8.24 | 137.33 | 0.88 | 30.56 | 191.22 | 71.71 | 1.51 | 5.47 | 17.55 | 81.17 |
| 6 | 13.51 | 12.17 | 144.21 | 0.95 | 31.39 | 198.06 | 72.67 | 1.67 | 5.46 | 9.81 | 80.70 |
| 7 | 7.58 | 16.89 | 150.49 | 0.89 | 31.29 | 202.63 | 74.67 | 1.45 | 5.44 | 26.48 | 73.18 |
| 8 | 8.04 | 4.94 | 139.38 | 0.92 | 32.17 | 202.88 | 75.26 | 1.58 | 5.29 | 21.74 | 80.08 |
| 9 | 6.84 | 3.76 | 142.03 | 0.93 | 31.91 | 201.93 | 74.55 | 1.88 | 5.42 | 62.10 | 79.32 |
| 10 | 8.60 | 7.79 | 138.91 | 0.91 | 31.14 | 196.85 | 73.41 | 1.60 | 5.55 | 9.42 | 76.74 |
| 11 | 8.46 | 5.11 | 144.17 | 0.90 | 32.03 | 205.76 | 75.94 | 1.56 | 5.32 | 10.39 | 85.70 |
| 12 | 5.33 | 1.78 | 138.81 | 0.84 | 31.86 | 199.65 | 73.84 | 1.33 | 5.36 | 16.97 | 81.62 |
| 13 | 10.74 | 9.17 | 131.93 | 0.96 | 31.06 | 202.07 | 75.50 | 1.87 | 4.77 | 21.67 | 82.53 |
| 14 | 8.76 | 5.21 | 140.06 | 0.92 | 30.90 | 191.44 | 72.92 | 1.90 | 5.33 | 16.83 | 82.43 |
| 15 | 12.21 | 3.28 | 148.40 | 0.91 | 32.31 | 204.80 | 75.41 | 1.57 | 5.42 | 7.94 | 84.39 |
| 16 | 8.11 | 6.84 | 139.51 | 0.82 | 31.48 | 199.52 | 74.39 | 1.33 | 5.43 | 43.01 | 81.23 |
| 17 | 7.53 | 13.80 | 138.23 | 0.87 | 31.29 | 196.84 | 73.13 | 1.53 | 5.68 | 7.12 | 81.08 |
| 18 | 8.33 | 3.01 | 138.95 | 0.88 | 31.49 | 197.09 | 73.47 | 1.65 | 5.49 | 14.88 | 82.09 |
| 19 | 9.16 | 7.68 | 141.91 | 0.87 | 31.69 | 203.77 | 75.15 | 1.50 | 5.55 | 7.81 | 80.80 |
| 20 | 6.77 | 6.91 | 136.82 | 0.85 | 31.11 | 196.56 | 73.20 | 1.59 | 5.47 | 30.07 | 77.72 |
| 21 | 4.40 | 4.03 | 153.06 | 0.88 | 31.25 | 193.19 | 72.28 | 1.59 | 6.33 | 23.30 | 79.36 |
| 22 | 3.87 | 10.26 | 144.07 | 0.88 | 30.15 | 185.03 | 70.75 | 1.53 | 5.74 | 25.51 | 81.09 |
| 23 | 5.01 | 4.99 | 139.86 | 0.86 | 30.36 | 187.21 | 70.78 | 1.49 | 5.62 | 5.48 | 80.01 |
| 24 | 4.32 | 8.44 | 145.04 | 0.85 | 30.42 | 185.80 | 69.81 | 1.59 | 6.16 | 17.80 | 80.36 |

TABLE 1-continued

Example sample burning quality data collection values

| Sample | $x_1$ | $x_2$ | $x_3$ | $x_4$ | $x_5$ | $x_6$ | $x_7$ | $x_8$ | $x_9$ | $x_{10}$ | $x_{11}$ |
|---|---|---|---|---|---|---|---|---|---|---|---|
| 25 | 6.10 | 8.35 | 140.26 | 0.88 | 30.31 | 188.72 | 70.84 | 1.57 | 5.61 | 1.59 | 77.43 |
| 26 | 5.35 | 2.17 | 137.93 | 0.87 | 30.46 | 186.47 | 70.40 | 1.67 | 5.69 | 11.12 | 80.10 |
| 27 | 6.30 | 2.21 | 140.95 | 0.86 | 29.97 | 186.18 | 70.10 | 1.75 | 5.89 | 2.81 | 81.46 |
| 28 | 5.45 | 6.77 | 137.82 | 0.91 | 30.21 | 188.77 | 71.29 | 1.63 | 5.95 | 19.39 | 82.66 |
| 29 | 5.84 | 10.08 | 137.98 | 0.93 | 30.63 | 191.25 | 71.05 | 1.78 | 5.72 | 8.89 | 79.08 |
| 30 | 6.25 | 7.38 | 141.37 | 0.87 | 31.78 | 195.48 | 71.19 | 1.51 | 6.36 | 19.00 | 79.15 |
| 31 | 3.90 | 6.14 | 138.72 | 0.89 | 30.59 | 185.83 | 69.49 | 1.56 | 6.25 | 30.65 | 78.88 |
| 32 | 6.62 | 11.42 | 137.93 | 0.90 | 31.22 | 193.23 | 70.47 | 1.76 | 5.93 | 44.26 | 79.89 |
| 33 | 4.06 | 8.18 | 140.93 | 0.92 | 30.82 | 191.99 | 71.39 | 1.87 | 5.91 | 13.47 | 78.41 |
| 34 | 6.26 | 1.81 | 142.72 | 0.91 | 30.32 | 186.07 | 70.70 | 1.80 | 6.05 | 17.89 | 79.09 |
| 35 | 4.10 | 9.75 | 139.56 | 0.85 | 30.76 | 191.08 | 70.65 | 1.59 | 6.12 | 17.39 | 77.30 |
| 36 | 6.69 | 6.32 | 138.87 | 0.92 | 29.94 | 182.79 | 70.21 | 1.69 | 5.70 | 44.05 | 78.50 |
| 37 | 4.51 | 7.51 | 140.08 | 0.90 | 31.68 | 196.36 | 71.47 | 1.55 | 6.39 | 0.48 | 80.91 |
| 38 | 5.51 | 4.40 | 137.43 | 0.91 | 31.25 | 193.70 | 72.53 | 1.58 | 6.20 | 51.67 | 77.41 |
| 39 | 8.09 | 12.83 | 133.01 | 0.89 | 31.19 | 196.53 | 72.27 | 1.67 | 5.52 | 35.07 | 78.20 |
| 40 | 4.50 | 4.86 | 136.76 | 0.86 | 31.15 | 190.78 | 71.06 | 1.52 | 5.92 | 9.67 | 78.01 |
| 41 | 4.36 | 6.52 | 139.44 | 0.95 | 30.73 | 195.15 | 71.35 | 1.62 | 6.32 | 13.33 | 81.14 |
| 42 | 6.03 | 6.99 | 135.60 | 0.97 | 30.59 | 190.98 | 71.16 | 1.71 | 5.92 | 66.46 | 80.21 |
| 43 | 7.11 | 8.53 | 138.30 | 0.91 | 31.67 | 202.14 | 75.29 | 1.74 | 6.39 | 18.65 | 81.56 |
| 44 | 4.83 | 2.43 | 138.21 | 0.99 | 31.79 | 201.29 | 74.08 | 1.65 | 6.30 | 5.23 | 81.79 |
| 45 | 7.52 | 6.42 | 134.73 | 1.04 | 30.35 | 191.21 | 72.36 | 1.86 | 5.70 | 82.80 | 82.28 |
| 46 | 9.52 | 9.30 | 131.61 | 1.05 | 30.94 | 200.86 | 76.11 | 1.88 | 5.62 | 38.02 | 83.18 |
| 47 | 4.14 | 0.93 | 136.77 | 0.89 | 31.21 | 194.74 | 72.67 | 1.61 | 6.34 | 37.72 | 79.65 |
| 48 | 8.65 | 9.28 | 142.10 | 1.00 | 31.12 | 198.66 | 74.33 | 1.83 | 6.09 | 10.18 | 78.64 |
| 49 | 5.59 | 9.90 | 139.49 | 0.99 | 31.76 | 202.49 | 73.70 | 1.84 | 6.38 | 15.43 | 80.83 |
| 50 | 4.65 | 7.84 | 144.93 | 0.95 | 30.86 | 193.89 | 74.27 | 1.73 | 6.10 | 15.57 | 78.34 |
| 51 | 6.20 | 9.50 | 139.11 | 0.93 | 31.73 | 201.08 | 74.47 | 1.75 | 6.03 | 25.70 | 84.19 |
| 52 | 9.41 | 4.67 | 134.98 | 1.03 | 31.12 | 197.27 | 73.71 | 1.84 | 5.93 | 12.67 | 79.48 |
| 53 | 4.22 | 4.34 | 136.92 | 0.90 | 31.85 | 199.06 | 74.16 | 1.41 | 5.78 | 20.68 | 82.10 |
| 54 | 4.63 | 8.47 | 137.88 | 0.91 | 31.03 | 195.23 | 73.03 | 1.59 | 5.97 | 29.54 | 81.23 |
| 55 | 6.75 | 6.21 | 134.56 | 0.95 | 31.26 | 196.64 | 72.79 | 1.65 | 5.68 | 7.60 | 81.00 |
| 56 | 4.11 | 8.27 | 134.58 | 0.90 | 31.69 | 197.38 | 73.31 | 1.51 | 5.83 | 15.54 | 81.28 |
| 57 | 7.16 | 2.00 | 136.58 | 0.96 | 31.41 | 198.24 | 74.31 | 1.59 | 6.27 | 10.06 | 80.88 |
| 58 | 6.01 | 4.57 | 146.20 | 0.94 | 31.61 | 199.55 | 74.49 | 1.70 | 6.27 | 7.09 | 84.62 |
| 59 | 7.44 | 0.89 | 135.33 | 0.98 | 30.79 | 192.84 | 72.72 | 1.91 | 5.73 | 20.26 | 80.02 |
| 60 | 4.96 | 3.13 | 136.01 | 0.94 | 31.36 | 197.72 | 74.05 | 1.63 | 5.95 | 28.21 | 82.56 |
| 61 | 8.06 | 9.30 | 142.35 | 1.06 | 31.61 | 201.66 | 73.78 | 1.99 | 6.44 | 50.27 | 79.96 |
| 62 | 2.86 | 3.35 | 141.61 | 0.91 | 32.13 | 202.89 | 74.61 | 1.58 | 7.47 | 46.31 | 80.62 |
| 63 | 6.25 | 2.46 | 143.96 | 0.99 | 31.70 | 197.05 | 73.36 | 1.97 | 7.44 | 15.93 | 80.76 |
| 64 | 6.22 | 2.83 | 141.19 | 0.98 | 32.54 | 202.29 | 75.15 | 1.87 | 7.70 | 75.41 | 81.05 |
| 65 | 8.59 | 6.06 | 142.64 | 0.97 | 30.37 | 191.94 | 71.93 | 1.60 | 7.36 | 33.85 | 80.72 |
| 66 | 4.74 | 12.40 | 138.75 | 0.95 | 32.08 | 199.62 | 73.43 | 1.87 | 8.05 | 46.26 | 81.26 |
| 67 | 4.69 | 5.52 | 139.58 | 0.92 | 30.01 | 186.86 | 70.62 | 1.60 | 8.15 | 154.76 | 82.42 |
| 68 | 3.99 | 14.84 | 138.83 | 0.89 | 30.08 | 188.87 | 70.60 | 1.52 | 7.82 | 54.39 | 83.51 |
| 69 | 6.21 | 6.34 | 140.91 | 0.93 | 30.88 | 194.88 | 72.07 | 1.75 | 8.56 | 2.76 | 80.44 |
| 70 | 8.03 | 0.98 | 137.33 | 0.99 | 30.93 | 196.31 | 73.69 | 1.67 | 7.56 | 5.67 | 82.15 |
| 71 | 4.32 | 2.51 | 139.01 | 0.96 | 31.03 | 195.73 | 72.75 | 1.65 | 6.87 | 9.81 | 81.45 |
| 72 | 4.81 | 5.10 | 142.38 | 0.92 | 32.26 | 198.83 | 73.46 | 1.45 | 7.27 | 15.82 | 82.13 |
| 73 | 4.24 | 1.79 | 140.78 | 0.95 | 31.28 | 191.71 | 71.73 | 1.75 | 6.96 | 54.57 | 84.03 |
| 74 | 8.14 | 7.33 | 143.66 | 0.99 | 32.23 | 205.55 | 75.57 | 1.96 | 7.44 | 3.64 | 81.08 |
| 75 | 5.79 | 3.45 | 154.74 | 0.94 | 32.19 | 204.38 | 75.29 | 1.60 | 7.62 | 28.28 | 79.56 |
| 76 | 8.43 | 7.23 | 137.38 | 1.04 | 31.25 | 196.48 | 74.50 | 1.95 | 7.03 | 49.60 | 81.74 |
| 77 | 5.93 | 4.49 | 138.86 | 1.02 | 32.40 | 201.67 | 74.64 | 1.86 | 7.77 | 5.30 | 81.12 |
| 78 | 5.17 | 13.26 | 157.33 | 0.92 | 31.26 | 198.53 | 73.32 | 1.96 | 7.62 | 8.52 | 77.32 |
| 79 | 7.38 | 1.48 | 137.67 | 0.99 | 31.28 | 194.45 | 73.27 | 1.85 | 6.48 | 22.84 | 78.70 |
| 80 | 5.81 | 3.67 | 138.20 | 1.02 | 31.13 | 194.21 | 73.29 | 1.84 | 6.56 | 9.37 | 80.33 |
| 81 | 5.37 | 2.72 | 138.33 | 0.92 | 31.14 | 193.84 | 71.33 | 1.53 | 6.75 | 4.24 | 81.32 |
| 82 | 4.54 | 7.92 | 134.78 | 0.91 | 30.18 | 188.75 | 72.49 | 1.55 | 6.14 | 10.55 | 81.28 |
| 83 | 5.94 | 3.33 | 136.04 | 0.95 | 31.28 | 195.74 | 73.31 | 1.62 | 6.45 | 9.49 | 79.99 |
| 84 | 7.36 | 8.73 | 144.12 | 0.89 | 30.74 | 192.65 | 72.49 | 1.60 | 6.39 | 1.68 | 81.14 |
| 85 | 8.66 | 18.64 | 140.60 | 1.00 | 31.25 | 202.64 | 74.39 | 1.60 | 6.77 | 11.44 | 80.71 |
| 86 | 8.08 | 10.71 | 138.63 | 1.00 | 31.20 | 203.34 | 75.61 | 1.61 | 6.34 | 12.27 | 81.95 |
| 87 | 3.99 | 11.24 | 138.98 | 0.89 | 30.72 | 192.91 | 72.74 | 1.58 | 6.34 | 27.45 | 80.87 |
| 88 | 7.83 | 20.81 | 141.77 | 0.94 | 30.91 | 196.81 | 72.79 | 1.66 | 6.19 | 71.43 | 80.74 |
| 89 | 5.16 | 9.12 | 144.82 | 0.86 | 30.96 | 195.54 | 72.98 | 1.47 | 6.90 | 11.49 | 81.04 |
| 90 | 3.73 | 7.52 | 141.64 | 0.91 | 31.69 | 201.15 | 73.71 | 1.45 | 6.81 | 67.19 | 80.94 |
| 91 | 4.41 | 1.99 | 139.43 | 0.90 | 30.82 | 194.35 | 71.35 | 1.46 | 6.35 | 2.83 | 79.71 |
| 92 | 4.76 | 1.61 | 141.05 | 0.94 | 30.33 | 189.43 | 72.17 | 1.76 | 5.93 | 4.21 | 80.36 |
| 93 | 3.50 | 2.37 | 140.01 | 0.86 | 30.36 | 187.58 | 70.07 | 1.47 | 5.59 | 16.49 | 79.77 |
| 94 | 7.91 | 7.88 | 140.56 | 1.00 | 30.47 | 193.19 | 72.89 | 1.84 | 5.85 | 10.73 | 78.19 |
| 95 | 4.65 | 6.77 | 140.26 | 0.90 | 31.06 | 196.12 | 72.96 | 1.69 | 6.17 | 13.10 | 80.43 |
| 96 | 7.48 | 14.39 | 138.35 | 0.92 | 30.10 | 192.23 | 72.00 | 1.70 | 5.66 | 18.97 | 81.72 |
| 97 | 5.38 | 9.68 | 138.24 | 0.90 | 30.43 | 193.24 | 72.41 | 1.60 | 5.87 | 11.24 | 81.54 |
| 98 | 3.04 | 6.22 | 142.51 | 0.88 | 30.33 | 189.60 | 71.22 | 1.53 | 5.96 | 38.29 | 81.18 |
| 99 | 3.65 | 9.62 | 151.04 | 0.90 | 31.08 | 194.88 | 71.66 | 1.56 | 6.36 | 13.40 | 80.42 |
| 100 | 4.88 | 9.36 | 139.78 | 0.91 | 30.98 | 195.76 | 71.76 | 1.58 | 6.33 | 16.14 | 81.80 |

TABLE 1-continued

Example sample burning quality data collection values

| Sample | $x_1$ | $x_2$ | $x_3$ | $x_4$ | $x_5$ | $x_6$ | $x_7$ | $x_8$ | $x_9$ | $x_{10}$ | $x_{11}$ |
|---|---|---|---|---|---|---|---|---|---|---|---|
| 101 | 9.42 | 8.67 | 136.29 | 0.97 | 30.60 | 185.80 | 71.10 | 1.94 | 5.50 | 29.13 | 81.56 |
| 102 | 4.05 | 10.03 | 142.95 | 0.86 | 30.10 | 187.31 | 71.66 | 1.75 | 5.98 | 27.56 | 81.41 |
| 103 | 4.63 | 1.05 | 138.81 | 0.89 | 30.38 | 186.08 | 70.12 | 1.67 | 5.84 | 7.55 | 82.47 |
| 104 | 4.63 | 9.92 | 138.75 | 0.86 | 30.54 | 191.90 | 72.49 | 1.49 | 5.24 | 14.69 | 80.93 |
| 105 | 4.09 | 4.51 | 137.49 | 0.85 | 30.65 | 190.04 | 71.42 | 1.47 | 5.53 | 3.98 | 77.60 |
| 106 | 5.26 | 3.65 | 136.10 | 0.88 | 30.67 | 192.29 | 72.40 | 1.60 | 5.37 | 12.20 | 80.78 |
| 107 | 9.63 | 3.86 | 137.55 | 0.91 | 30.37 | 194.32 | 74.06 | 1.85 | 5.40 | 80.80 | 81.26 |
| 108 | 7.69 | 7.40 | 143.09 | 0.89 | 30.79 | 191.45 | 72.18 | 1.52 | 5.40 | 11.56 | 81.90 |
| 109 | 5.75 | 11.59 | 140.94 | 0.92 | 30.17 | 188.08 | 70.91 | 1.83 | 5.79 | 14.02 | 80.28 |
| 110 | 4.01 | 7.57 | 147.22 | 0.84 | 30.18 | 187.23 | 70.55 | 1.46 | 5.40 | 56.21 | 81.57 |
| 111 | 5.95 | 4.16 | 135.27 | 0.89 | 29.99 | 181.20 | 68.78 | 1.62 | 5.10 | 12.16 | 81.31 |
| 112 | 7.10 | 10.78 | 137.22 | 0.86 | 30.80 | 191.89 | 71.65 | 1.68 | 4.81 | 18.95 | 80.76 |
| 113 | 5.66 | 2.98 | 136.54 | 0.90 | 29.35 | 180.29 | 70.15 | 1.67 | 4.87 | 28.07 | 77.01 |
| 114 | 6.23 | 4.32 | 141.66 | 0.90 | 30.07 | 188.44 | 71.20 | 1.65 | 5.00 | 27.01 | 81.77 |
| 115 | 6.06 | 9.70 | 141.74 | 0.87 | 30.97 | 190.48 | 71.55 | 1.93 | 5.36 | 16.33 | 80.91 |
| 116 | 6.15 | 12.84 | 143.97 | 0.98 | 30.75 | 190.53 | 71.80 | 2.44 | 4.67 | 10.34 | 82.29 |
| 117 | 6.72 | 3.48 | 137.77 | 0.90 | 29.33 | 180.57 | 70.07 | 1.86 | 5.29 | 4.63 | 79.41 |
| 118 | 8.50 | 5.94 | 136.58 | 1.00 | 31.09 | 189.63 | 70.78 | 1.98 | 5.46 | 20.49 | 80.86 |
| 119 | 10.53 | 3.22 | 135.43 | 1.00 | 30.42 | 189.96 | 71.48 | 2.06 | 5.08 | 20.22 | 81.55 |
| 120 | 5.76 | 3.12 | 142.54 | 0.93 | 31.03 | 192.25 | 72.10 | 1.70 | 5.34 | 6.66 | 81.36 |
| 121 | 3.33 | 3.33 | 147.43 | 0.91 | 29.40 | 183.36 | 70.64 | 1.44 | 5.73 | 7.78 | 72.70 |
| 122 | 4.84 | 4.27 | 144.03 | 0.91 | 31.24 | 195.56 | 72.22 | 1.68 | 6.26 | 13.84 | 80.25 |
| 123 | 4.55 | 8.71 | 148.63 | 0.92 | 30.10 | 188.03 | 71.92 | 1.71 | 5.75 | 9.49 | 70.64 |
| 124 | 2.45 | 3.47 | 145.55 | 0.84 | 30.66 | 188.97 | 70.19 | 1.36 | 6.42 | 23.14 | 80.75 |
| 125 | 3.20 | 4.61 | 145.75 | 0.86 | 30.13 | 188.12 | 71.04 | 1.52 | 6.27 | 7.74 | 84.28 |
| 126 | 3.56 | 3.59 | 149.13 | 0.88 | 30.08 | 189.44 | 72.40 | 1.59 | 6.16 | 28.62 | 82.72 |
| 127 | 6.27 | 6.15 | 149.66 | 1.01 | 30.84 | 198.48 | 74.01 | 1.72 | 6.12 | 42.37 | 82.01 |
| 128 | 3.48 | 1.66 | 145.66 | 0.91 | 31.11 | 194.41 | 72.25 | 1.70 | 5.57 | 43.68 | 80.28 |
| 129 | 1.59 | 10.32 | 150.25 | 0.82 | 31.04 | 197.67 | 72.10 | 1.48 | 6.30 | 14.16 | 80.73 |
| 130 | 2.10 | 4.42 | 151.17 | 0.86 | 30.99 | 196.67 | 74.17 | 1.48 | 5.94 | 19.55 | 80.87 |
| 131 | 4.52 | 17.02 | 146.49 | 0.87 | 30.67 | 194.95 | 72.24 | 1.64 | 5.97 | 7.42 | 80.27 |
| 132 | 2.19 | 10.85 | 157.19 | 0.87 | 31.75 | 205.28 | 74.75 | 1.54 | 6.46 | 30.72 | 83.48 |
| 133 | 4.71 | 4.53 | 142.00 | 0.87 | 31.02 | 198.88 | 74.48 | 1.59 | 5.55 | 20.13 | 81.56 |
| 134 | 2.57 | 2.31 | 150.79 | 0.89 | 30.39 | 192.50 | 72.72 | 1.53 | 5.96 | 20.45 | 82.74 |
| 135 | 1.71 | 2.74 | 149.20 | 0.81 | 30.30 | 191.23 | 71.60 | 1.39 | 6.11 | 22.91 | 82.14 |
| 136 | 1.82 | 5.92 | 151.65 | 0.85 | 30.91 | 194.20 | 73.44 | 1.44 | 6.41 | 19.69 | 80.69 |
| 137 | 3.45 | 1.63 | 149.81 | 0.84 | 32.43 | 210.04 | 76.48 | 1.50 | 6.37 | 13.77 | 81.77 |
| 138 | 2.80 | 7.31 | 146.67 | 0.82 | 30.99 | 200.80 | 76.21 | 1.44 | 5.80 | 14.28 | 81.59 |
| 139 | 4.51 | 4.49 | 152.57 | 0.86 | 31.30 | 198.96 | 74.62 | 1.62 | 6.05 | 14.21 | 75.00 |
| 140 | 4.10 | 3.47 | 151.40 | 0.82 | 30.88 | 198.37 | 75.33 | 1.46 | 6.18 | 28.90 | 76.79 |
| 141 | 7.92 | 12.72 | 142.12 | 0.88 | 30.63 | 196.34 | 73.43 | 1.41 | 5.31 | 2.44 | 76.28 |
| 142 | 6.53 | 3.64 | 135.85 | 0.92 | 30.84 | 195.89 | 73.19 | 1.59 | 5.54 | 11.51 | 80.25 |
| 143 | 4.08 | 13.53 | 142.23 | 0.81 | 30.58 | 193.97 | 72.29 | 1.25 | 5.91 | 8.96 | 80.78 |
| 144 | 4.64 | 3.36 | 136.77 | 0.84 | 31.33 | 197.71 | 74.56 | 1.48 | 5.71 | 14.97 | 80.97 |
| 145 | 4.98 | 2.78 | 140.68 | 0.83 | 32.04 | 200.30 | 74.86 | 1.47 | 5.94 | 38.78 | 82.53 |
| 146 | 7.42 | 2.56 | 140.80 | 0.88 | 30.67 | 197.16 | 74.09 | 1.48 | 5.55 | 4.08 | 80.74 |
| 147 | 5.78 | 4.84 | 139.50 | 0.84 | 31.33 | 200.31 | 75.20 | 1.25 | 5.88 | 63.48 | 82.17 |
| 148 | 5.59 | 7.18 | 143.88 | 0.87 | 31.48 | 198.04 | 73.34 | 1.44 | 6.27 | 15.57 | 80.37 |
| 149 | 7.55 | 23.72 | 142.70 | 0.84 | 30.65 | 198.97 | 73.52 | 1.35 | 5.65 | 20.54 | 81.32 |
| 150 | 6.35 | 4.63 | 138.31 | 0.86 | 29.70 | 187.97 | 72.86 | 1.41 | 5.35 | 18.54 | 81.02 |
| 151 | 4.78 | 6.06 | 136.71 | 0.87 | 30.94 | 196.34 | 73.51 | 1.41 | 5.76 | 36.13 | 80.30 |
| 152 | 7.10 | 8.06 | 141.17 | 0.89 | 31.95 | 204.51 | 75.75 | 1.53 | 5.87 | 99.52 | 81.35 |
| 153 | 8.49 | 12.77 | 136.33 | 0.95 | 30.96 | 201.00 | 74.62 | 1.55 | 5.61 | 25.61 | 81.04 |
| 154 | 8.93 | 11.04 | 136.15 | 0.86 | 30.78 | 197.64 | 74.64 | 1.38 | 5.75 | 23.69 | 81.01 |
| 155 | 8.43 | 4.66 | 140.05 | 0.93 | 31.53 | 200.93 | 74.58 | 1.69 | 6.03 | 1.52 | 80.74 |
| 156 | 4.89 | 12.82 | 141.32 | 0.89 | 31.13 | 198.53 | 73.19 | 1.46 | 6.39 | 30.03 | 81.73 |
| 157 | 4.61 | 12.10 | 142.65 | 0.83 | 31.91 | 202.52 | 73.07 | 1.32 | 6.42 | 11.35 | 81.34 |
| 158 | 5.81 | 4.17 | 139.47 | 0.85 | 31.66 | 201.22 | 75.73 | 1.44 | 6.33 | 16.81 | 81.07 |
| 159 | 4.31 | 5.83 | 143.70 | 0.88 | 30.87 | 192.46 | 72.75 | 1.51 | 5.98 | 4.31 | 79.94 |
| 160 | 5.34 | 9.36 | 137.89 | 0.92 | 32.30 | 205.24 | 75.05 | 1.58 | 6.30 | 54.73 | 80.99 |
| 161 | 10.86 | 7.06 | 137.75 | 0.95 | 30.95 | 193.57 | 71.54 | 1.70 | 6.68 | 36.89 | 84.36 |
| 162 | 8.04 | 4.56 | 142.92 | 0.93 | 30.25 | 186.95 | 70.39 | 1.66 | 8.08 | 9.23 | 82.54 |
| 163 | 8.86 | 8.58 | 143.89 | 0.95 | 30.21 | 188.08 | 71.09 | 1.78 | 7.19 | 35.37 | 81.75 |
| 164 | 7.27 | 1.56 | 145.54 | 0.91 | 29.93 | 185.61 | 69.97 | 1.72 | 7.49 | 8.80 | 81.13 |
| 165 | 9.83 | 8.83 | 136.00 | 1.03 | 30.63 | 191.37 | 70.19 | 1.99 | 7.54 | 8.24 | 80.07 |
| 166 | 6.39 | 10.70 | 140.43 | 0.87 | 30.57 | 194.59 | 72.51 | 1.35 | 6.71 | 38.32 | 79.07 |
| 167 | 8.40 | 5.32 | 138.02 | 0.98 | 30.21 | 186.87 | 70.71 | 1.73 | 6.57 | 16.42 | 80.71 |
| 168 | 3.91 | 7.95 | 140.54 | 0.88 | 30.42 | 192.64 | 72.76 | 1.48 | 7.02 | 42.07 | 79.68 |
| 169 | 9.68 | 1.86 | 137.52 | 0.92 | 30.34 | 192.70 | 72.23 | 1.63 | 6.76 | 4.05 | 82.23 |
| 170 | 8.34 | 2.04 | 140.98 | 0.89 | 29.80 | 186.87 | 71.09 | 1.77 | 7.88 | 24.45 | 81.40 |
| 171 | 8.50 | 7.55 | 142.00 | 0.95 | 31.39 | 198.20 | 73.72 | 1.63 | 6.93 | 28.67 | 81.23 |
| 172 | 11.65 | 16.34 | 135.99 | 0.95 | 30.80 | 205.20 | 76.08 | 1.84 | 6.32 | 6.61 | 80.53 |
| 173 | 10.32 | 9.96 | 135.52 | 1.02 | 29.98 | 189.11 | 71.28 | 1.69 | 6.23 | 5.64 | 78.47 |
| 174 | 8.89 | 8.55 | 136.62 | 0.98 | 30.38 | 192.39 | 72.64 | 1.80 | 6.49 | 12.18 | 83.32 |
| 175 | 11.13 | 22.69 | 137.88 | 1.01 | 30.13 | 192.89 | 70.20 | 1.76 | 6.68 | 11.33 | 81.86 |
| 176 | 10.42 | 4.39 | 138.58 | 0.97 | 30.74 | 194.16 | 72.94 | 1.91 | 6.27 | 27.86 | 80.60 |

TABLE 1-continued

Example sample burning quality data collection values

| Sample | $x_1$ | $x_2$ | $x_3$ | $x_4$ | $x_5$ | $x_6$ | $x_7$ | $x_8$ | $x_9$ | $x_{10}$ | $x_{11}$ |
|---|---|---|---|---|---|---|---|---|---|---|---|
| 177 | 8.10 | 7.85 | 138.90 | 0.88 | 31.97 | 202.31 | 74.02 | 1.43 | 6.41 | 6.91 | 80.43 |
| 178 | 7.25 | 6.12 | 137.23 | 0.94 | 30.58 | 192.66 | 72.31 | 1.43 | 6.33 | 19.02 | 81.36 |
| 179 | 5.62 | 5.51 | 141.03 | 0.87 | 30.81 | 189.41 | 71.31 | 1.46 | 7.09 | 21.32 | 80.21 |
| 180 | 9.71 | 0.14 | 140.31 | 0.94 | 30.52 | 193.78 | 73.19 | 1.70 | 7.00 | 26.53 | 81.55 |
| 181 | 7.87 | 5.09 | 136.68 | 0.92 | 31.64 | 200.54 | 72.73 | 1.70 | 6.35 | 12.57 | 83.07 |
| 182 | 6.36 | 5.20 | 140.23 | 0.93 | 29.34 | 180.62 | 69.79 | 1.71 | 6.23 | 10.04 | 83.69 |
| 183 | 7.11 | 2.33 | 141.90 | 0.88 | 29.70 | 182.33 | 70.19 | 1.67 | 6.11 | 34.61 | 80.45 |
| 184 | 8.59 | 10.78 | 139.89 | 0.90 | 30.99 | 196.52 | 72.77 | 1.62 | 6.40 | 25.79 | 81.29 |
| 185 | 6.69 | 4.39 | 143.97 | 0.89 | 31.63 | 198.34 | 72.49 | 1.68 | 6.36 | 34.54 | 79.80 |
| 186 | 5.79 | 5.53 | 144.77 | 0.94 | 29.38 | 180.76 | 69.41 | 1.64 | 6.83 | 20.54 | 80.37 |
| 187 | 10.65 | 9.81 | 140.49 | 0.98 | 30.54 | 187.06 | 69.09 | 1.82 | 6.30 | 44.60 | 80.68 |
| 188 | 8.88 | 10.35 | 138.18 | 0.94 | 29.19 | 175.53 | 68.24 | 1.62 | 6.13 | 1.52 | 79.73 |
| 189 | 7.15 | 6.44 | 138.13 | 0.99 | 29.75 | 182.98 | 68.60 | 1.72 | 6.29 | 15.29 | 81.16 |
| 190 | 10.05 | 7.23 | 139.20 | 0.99 | 31.57 | 195.21 | 71.38 | 1.94 | 6.37 | 9.28 | 80.59 |
| 191 | 6.38 | 2.50 | 144.09 | 0.87 | 30.12 | 183.54 | 69.06 | 1.50 | 6.16 | 21.12 | 74.10 |
| 192 | 7.03 | 7.07 | 150.65 | 0.94 | 29.96 | 188.57 | 71.02 | 1.70 | 6.26 | 20.19 | 75.41 |
| 193 | 8.59 | 6.74 | 144.63 | 0.89 | 30.57 | 189.18 | 70.68 | 1.79 | 6.11 | 32.93 | 81.85 |
| 194 | 6.68 | 3.42 | 140.17 | 0.93 | 31.21 | 193.03 | 70.12 | 1.69 | 6.41 | 103.46 | 80.44 |
| 195 | 5.80 | 8.70 | 140.36 | 0.92 | 31.34 | 188.34 | 69.26 | 1.60 | 6.31 | 42.07 | 81.19 |
| 196 | 9.03 | 9.11 | 143.19 | 0.97 | 30.91 | 190.75 | 70.73 | 1.88 | 6.20 | 1.59 | 81.72 |
| 197 | 5.81 | 4.46 | 141.55 | 0.86 | 30.92 | 189.85 | 70.46 | 1.65 | 6.30 | 4.67 | 80.80 |
| 198 | 7.00 | 2.77 | 139.83 | 0.86 | 30.29 | 191.90 | 71.37 | 1.47 | 6.19 | 26.94 | 80.45 |
| 199 | 8.27 | 7.18 | 145.81 | 0.92 | 32.55 | 203.26 | 73.26 | 1.65 | 6.37 | 23.23 | 81.67 |
| 200 | 8.84 | 5.77 | 142.94 | 0.89 | 31.21 | 191.61 | 70.80 | 1.79 | 6.24 | 2.88 | 80.54 |
| 201 | 3.33 | 7.98 | 145.63 | 0.83 | 30.64 | 190.29 | 69.86 | 1.32 | 5.44 | 14.48 | 82.98 |
| 202 | 6.71 | 1.44 | 139.57 | 0.87 | 30.23 | 190.40 | 72.22 | 1.49 | 5.02 | 14.53 | 79.61 |
| 203 | 10.78 | 7.99 | 135.01 | 0.96 | 30.42 | 188.58 | 70.15 | 1.76 | 5.23 | 13.82 | 79.90 |
| 204 | 6.31 | 1.94 | 135.18 | 0.88 | 30.09 | 189.41 | 71.25 | 1.36 | 5.40 | 10.92 | 80.55 |
| 205 | 9.71 | 2.32 | 136.34 | 0.91 | 29.36 | 183.23 | 69.81 | 1.70 | 5.35 | 12.32 | 81.56 |
| 206 | 8.02 | 5.89 | 138.25 | 0.90 | 30.43 | 187.37 | 69.59 | 1.61 | 5.51 | 15.38 | 80.74 |
| 207 | 5.99 | 7.83 | 140.18 | 0.86 | 30.47 | 188.04 | 69.86 | 1.59 | 5.98 | 18.88 | 81.44 |
| 208 | 6.06 | 7.23 | 141.97 | 0.85 | 30.85 | 193.06 | 72.01 | 1.46 | 5.43 | 8.31 | 81.05 |
| 209 | 4.17 | 2.36 | 135.37 | 0.85 | 30.14 | 186.90 | 70.26 | 1.49 | 5.68 | 22.34 | 80.24 |
| 210 | 7.87 | 16.25 | 141.07 | 0.93 | 31.02 | 194.60 | 71.24 | 1.68 | 5.39 | 22.31 | 81.27 |
| 211 | 6.73 | 10.51 | 141.61 | 0.95 | 30.32 | 185.53 | 69.50 | 1.68 | 5.34 | 10.20 | 80.43 |
| 212 | 10.66 | 11.59 | 141.20 | 0.98 | 30.61 | 187.47 | 69.83 | 1.89 | 5.19 | 14.78 | 81.17 |
| 213 | 6.25 | 1.68 | 142.68 | 0.95 | 30.64 | 190.18 | 70.35 | 1.70 | 5.30 | 28.58 | 80.47 |
| 214 | 5.65 | 2.54 | 143.34 | 0.91 | 30.90 | 188.82 | 70.50 | 1.75 | 5.27 | 10.62 | 81.21 |
| 215 | 6.60 | 8.84 | 139.59 | 0.89 | 29.64 | 182.36 | 68.85 | 1.49 | 5.37 | 27.91 | 81.30 |
| 216 | 8.07 | 1.98 | 142.89 | 0.93 | 30.02 | 185.17 | 70.18 | 1.58 | 5.35 | 21.30 | 81.58 |
| 217 | 5.69 | 5.48 | 140.02 | 0.85 | 30.04 | 182.18 | 69.09 | 1.59 | 5.32 | 50.54 | 84.50 |
| 218 | 8.27 | 5.42 | 139.93 | 0.91 | 31.51 | 196.86 | 71.33 | 1.72 | 5.41 | 63.28 | 79.56 |
| 219 | 7.41 | 8.48 | 143.38 | 0.93 | 32.05 | 201.79 | 72.04 | 1.67 | 5.54 | 14.12 | 81.12 |
| 220 | 5.98 | 5.55 | 142.34 | 0.88 | 30.73 | 189.17 | 71.79 | 1.51 | 5.58 | 5.00 | 80.84 |
| 221 | 11.69 | 8.64 | 142.02 | 0.96 | 31.29 | 195.08 | 73.51 | 1.84 | 6.00 | 16.58 | 81.76 |
| 222 | 7.68 | 4.29 | 141.72 | 0.95 | 31.25 | 195.72 | 72.59 | 1.62 | 5.86 | 8.15 | 84.44 |
| 223 | 10.46 | 10.16 | 143.88 | 0.95 | 30.41 | 197.46 | 74.74 | 1.63 | 5.34 | 8.36 | 72.15 |
| 224 | 8.06 | 2.87 | 136.73 | 0.91 | 30.80 | 187.33 | 70.20 | 1.67 | 5.72 | 12.94 | 79.14 |
| 225 | 11.25 | 3.21 | 142.74 | 0.97 | 30.73 | 189.20 | 71.39 | 1.93 | 5.77 | 18.15 | 81.35 |
| 226 | 9.92 | 8.49 | 138.70 | 0.94 | 30.89 | 193.30 | 73.41 | 1.73 | 5.53 | 23.21 | 82.34 |
| 227 | 8.45 | 2.51 | 143.39 | 0.95 | 32.05 | 199.51 | 71.56 | 1.90 | 6.43 | 41.54 | 81.68 |
| 228 | 5.53 | 10.04 | 139.49 | 0.88 | 29.40 | 183.89 | 70.48 | 1.37 | 5.30 | 49.05 | 79.02 |
| 229 | 9.29 | 7.93 | 147.37 | 0.90 | 32.04 | 196.74 | 72.05 | 1.67 | 6.34 | 11.21 | 80.61 |
| 230 | 9.58 | 6.42 | 134.71 | 0.96 | 30.18 | 187.46 | 71.43 | 1.87 | 5.66 | 5.02 | 80.99 |
| 231 | 8.80 | 1.70 | 143.56 | 0.89 | 32.35 | 197.90 | 71.58 | 1.52 | 6.36 | 40.76 | 80.89 |
| 232 | 7.62 | 1.97 | 154.74 | 0.92 | 32.40 | 199.50 | 72.62 | 1.57 | 6.45 | 24.43 | 80.77 |
| 233 | 9.02 | 3.44 | 139.58 | 0.92 | 31.39 | 193.31 | 71.91 | 1.81 | 5.64 | 4.21 | 79.79 |
| 234 | 7.21 | 7.13 | 137.68 | 0.92 | 31.78 | 201.71 | 74.30 | 1.60 | 5.61 | 18.33 | 78.89 |
| 235 | 6.16 | 9.02 | 141.13 | 0.89 | 31.41 | 196.49 | 73.19 | 1.41 | 5.89 | 10.98 | 80.88 |
| 236 | 9.94 | 7.86 | 143.30 | 0.97 | 32.50 | 201.29 | 72.64 | 1.59 | 5.57 | 29.50 | 79.72 |
| 237 | 5.94 | 2.47 | 142.31 | 0.87 | 31.48 | 197.32 | 72.48 | 1.46 | 5.86 | 17.34 | 81.07 |
| 238 | 5.30 | 4.50 | 139.50 | 0.90 | 30.15 | 188.47 | 73.24 | 1.67 | 5.73 | 5.07 | 79.68 |
| 239 | 7.53 | 7.36 | 137.84 | 0.91 | 31.01 | 194.78 | 72.69 | 1.46 | 5.53 | 21.07 | 81.06 |
| 240 | 5.53 | 9.38 | 142.57 | 0.85 | 31.52 | 196.59 | 73.15 | 1.46 | 5.54 | 22.31 | 82.38 |
| 241 | 5.20 | 4.39 | 144.97 | 0.87 | 30.65 | 191.15 | 71.96 | 1.58 | 5.95 | 45.32 | 81.36 |
| 242 | 6.79 | 6.65 | 141.21 | 0.95 | 30.35 | 185.29 | 70.92 | 1.52 | 5.38 | 12.92 | 81.55 |
| 243 | 7.97 | 7.76 | 137.37 | 0.93 | 31.28 | 198.99 | 74.19 | 1.69 | 5.51 | 17.64 | 81.09 |
| 244 | 6.58 | 6.80 | 139.11 | 0.89 | 31.04 | 198.38 | 74.02 | 1.53 | 5.74 | 62.86 | 80.12 |
| 245 | 7.03 | 2.48 | 139.14 | 0.90 | 31.03 | 196.40 | 73.23 | 1.82 | 5.90 | 42.12 | 77.73 |
| 246 | 7.59 | 4.02 | 141.87 | 0.87 | 30.92 | 194.08 | 73.33 | 1.46 | 5.73 | 29.22 | 80.98 |
| 247 | 9.58 | 1.76 | 146.56 | 0.92 | 31.51 | 198.59 | 74.71 | 1.76 | 6.22 | 23.03 | 81.55 |
| 248 | 4.55 | 4.55 | 143.20 | 0.82 | 30.91 | 190.80 | 72.38 | 1.33 | 5.83 | 55.82 | 80.91 |
| 249 | 5.69 | 7.23 | 142.33 | 0.88 | 30.81 | 196.18 | 72.81 | 1.58 | 6.14 | 11.97 | 81.70 |
| 250 | 5.29 | 8.72 | 141.67 | 0.90 | 32.00 | 200.99 | 74.27 | 1.67 | 6.22 | 22.75 | 80.20 |
| 251 | 5.99 | 12.18 | 143.45 | 0.83 | 30.75 | 193.13 | 72.10 | 1.47 | 5.61 | 22.75 | 79.77 |
| 252 | 7.45 | 10.16 | 147.59 | 0.96 | 32.08 | 204.57 | 76.15 | 1.67 | 5.34 | 5.39 | 81.54 |

TABLE 1-continued

Example sample burning quality data collection values

| Sample | $x_1$ | $x_2$ | $x_3$ | $x_4$ | $x_5$ | $x_6$ | $x_7$ | $x_8$ | $x_9$ | $x_{10}$ | $x_{11}$ |
|---|---|---|---|---|---|---|---|---|---|---|---|
| 253 | 5.88 | 4.70 | 143.17 | 0.86 | 30.95 | 192.53 | 71.92 | 1.47 | 5.91 | 33.48 | 81.73 |
| 254 | 6.17 | 0.60 | 141.52 | 0.83 | 30.11 | 195.34 | 74.78 | 1.41 | 5.35 | 13.75 | 81.29 |
| 255 | 7.42 | 13.41 | 137.96 | 0.88 | 30.37 | 193.85 | 72.22 | 1.51 | 5.40 | 11.70 | 81.78 |
| 256 | 4.39 | 3.11 | 140.16 | 0.84 | 30.00 | 189.91 | 72.24 | 1.37 | 5.85 | 87.75 | 80.77 |
| 257 | 5.97 | 6.90 | 137.66 | 0.87 | 31.68 | 198.97 | 71.98 | 1.32 | 5.46 | 10.04 | 80.46 |
| 258 | 4.99 | 7.59 | 140.28 | 0.88 | 30.52 | 191.58 | 72.25 | 1.42 | 5.80 | 10.96 | 81.57 |
| 259 | 1.75 | 4.63 | 148.55 | 0.79 | 30.42 | 189.34 | 70.27 | 1.38 | 6.28 | 10.16 | 81.24 |
| 260 | 2.65 | 8.50 | 144.43 | 0.78 | 30.29 | 188.60 | 71.70 | 1.26 | 6.08 | 56.65 | 80.47 |
| 261 | 7.43 | 7.50 | 140.07 | 1.01 | 31.91 | 198.59 | 73.37 | 1.78 | 6.30 | 17.68 | 81.32 |
| 262 | 4.76 | 2.89 | 142.55 | 0.93 | 31.02 | 192.96 | 72.88 | 1.62 | 6.05 | 10.43 | 81.59 |
| 263 | 5.57 | 5.26 | 142.50 | 0.98 | 32.22 | 201.28 | 72.99 | 1.61 | 6.40 | 41.33 | 81.41 |
| 264 | 9.52 | 12.39 | 138.49 | 1.05 | 30.07 | 191.99 | 73.08 | 1.82 | 5.83 | 13.10 | 81.82 |
| 265 | 10.39 | 7.11 | 142.08 | 1.09 | 31.56 | 202.02 | 75.59 | 1.37 | 6.30 | 3.87 | 83.04 |
| 266 | 6.64 | 2.59 | 142.30 | 0.96 | 30.00 | 185.92 | 70.52 | 1.60 | 6.02 | 25.88 | 80.90 |
| 267 | 3.46 | 5.96 | 142.34 | 0.92 | 31.93 | 203.54 | 75.46 | 1.46 | 6.24 | 16.35 | 80.82 |
| 268 | 3.97 | 4.71 | 144.70 | 0.95 | 30.60 | 193.72 | 73.21 | 1.54 | 6.12 | 53.40 | 80.34 |
| 269 | 6.99 | 11.90 | 139.68 | 0.94 | 30.60 | 199.90 | 75.42 | 1.84 | 6.40 | 71.52 | 81.27 |
| 270 | 6.26 | 2.93 | 143.42 | 0.92 | 30.93 | 197.26 | 74.39 | 1.64 | 6.43 | 78.68 | 81.15 |
| 271 | 7.21 | 2.11 | 138.65 | 1.02 | 31.24 | 198.68 | 74.97 | 1.72 | 5.64 | 16.69 | 83.50 |
| 272 | 10.73 | 2.98 | 140.29 | 1.08 | 30.76 | 198.15 | 74.56 | 1.93 | 5.55 | 22.45 | 80.54 |
| 273 | 4.34 | 3.89 | 141.55 | 0.94 | 31.56 | 201.66 | 73.81 | 1.64 | 6.50 | 20.19 | 81.74 |
| 274 | 7.30 | 6.88 | 136.27 | 0.95 | 31.35 | 204.28 | 76.20 | 1.73 | 5.54 | 8.01 | 81.04 |
| 275 | 11.96 | 6.51 | 140.03 | 1.05 | 30.14 | 192.08 | 72.91 | 1.85 | 5.81 | 19.16 | 81.46 |
| 276 | 6.65 | 15.62 | 140.63 | 0.92 | 31.55 | 204.83 | 75.84 | 1.44 | 5.88 | 14.58 | 81.20 |
| 277 | 4.08 | 2.02 | 140.35 | 0.93 | 31.41 | 201.11 | 74.98 | 1.48 | 6.22 | 11.35 | 79.84 |
| 278 | 5.01 | 1.72 | 143.21 | 0.95 | 31.49 | 200.90 | 76.15 | 1.63 | 6.09 | 6.24 | 78.48 |
| 279 | 8.23 | 8.04 | 143.20 | 0.97 | 30.74 | 195.59 | 74.75 | 1.86 | 5.77 | 5.46 | 81.11 |
| 280 | 7.25 | 9.20 | 149.11 | 1.03 | 32.12 | 208.26 | 75.82 | 1.89 | 6.36 | 42.21 | 81.10 |
| 281 | 2.58 | 12.22 | 149.89 | 0.80 | 30.61 | 196.41 | 73.74 | 1.16 | 6.49 | 34.70 | 80.69 |
| 282 | 2.38 | 7.85 | 145.57 | 0.84 | 29.72 | 187.50 | 72.96 | 1.47 | 6.07 | 20.17 | 78.40 |
| 283 | 2.61 | 4.67 | 145.84 | 0.88 | 30.71 | 198.65 | 74.95 | 1.46 | 5.59 | 17.18 | 81.23 |
| 284 | 4.91 | 12.65 | 145.69 | 0.86 | 30.26 | 196.66 | 73.24 | 1.37 | 5.65 | 3.62 | 83.99 |
| 285 | 7.17 | 5.74 | 146.31 | 0.93 | 30.13 | 194.87 | 74.46 | 1.76 | 5.90 | 16.26 | 80.66 |
| 286 | 2.77 | 1.84 | 146.66 | 0.85 | 30.57 | 192.89 | 73.04 | 1.50 | 6.05 | 36.61 | 83.63 |
| 287 | 2.18 | 1.59 | 145.95 | 0.82 | 31.37 | 199.25 | 73.91 | 1.29 | 6.32 | 2.42 | 81.56 |
| 288 | 1.93 | 1.84 | 148.69 | 0.79 | 31.19 | 198.89 | 74.29 | 1.38 | 6.57 | 15.64 | 80.96 |
| 289 | 2.14 | 4.30 | 155.68 | 0.82 | 30.87 | 194.29 | 72.99 | 1.31 | 6.24 | 7.88 | 81.28 |
| 290 | 0.87 | 4.10 | 150.44 | 0.77 | 30.57 | 191.43 | 72.86 | 1.24 | 6.63 | 2.60 | 80.96 |
| 291 | 2.75 | 9.74 | 153.57 | 0.82 | 31.44 | 200.67 | 75.20 | 1.41 | 6.28 | 29.50 | 82.09 |
| 292 | 4.47 | 4.39 | 146.80 | 0.93 | 31.26 | 197.57 | 73.46 | 1.77 | 5.70 | 11.19 | 82.82 |
| 293 | 3.20 | 1.71 | 144.10 | 0.83 | 30.99 | 197.02 | 73.60 | 1.32 | 5.81 | 7.74 | 80.95 |
| 294 | 2.96 | 8.27 | 151.27 | 0.81 | 30.45 | 194.83 | 73.51 | 1.41 | 5.93 | 15.15 | 80.95 |
| 295 | 3.10 | 9.87 | 143.23 | 0.86 | 30.53 | 196.00 | 73.19 | 1.32 | 6.17 | 34.63 | 81.41 |
| 296 | 3.15 | 16.53 | 144.55 | 0.86 | 31.09 | 196.92 | 72.51 | 1.32 | 6.18 | 21.83 | 83.22 |
| 297 | 2.26 | 6.87 | 145.83 | 0.81 | 30.95 | 196.38 | 72.99 | 1.41 | 6.28 | 75.69 | 81.68 |
| 298 | 1.97 | 7.34 | 147.11 | 0.80 | 31.43 | 201.41 | 72.92 | 1.29 | 6.43 | 19.67 | 80.87 |
| 299 | 1.85 | 7.63 | 144.49 | 0.86 | 31.26 | 196.24 | 73.08 | 1.38 | 6.08 | 44.30 | 81.54 |
| 300 | 3.02 | 2.72 | 145.87 | 0.84 | 31.38 | 200.30 | 74.21 | 1.32 | 6.33 | 25.47 | 79.86 |
| 301 | 8.16 | 3.74 | 152.10 | 0.84 | 29.90 | 189.66 | 67.51 | 1.41 | 5.86 | 35.05 | 81.12 |
| 302 | 9.95 | 3.84 | 150.05 | 0.90 | 29.51 | 186.94 | 68.26 | 1.65 | 6.15 | 13.95 | 81.82 |
| 303 | 8.82 | 3.91 | 149.91 | 0.94 | 30.09 | 195.55 | 71.20 | 1.67 | 5.76 | 9.12 | 80.91 |
| 304 | 7.90 | 13.28 | 150.45 | 0.88 | 29.99 | 193.89 | 69.60 | 1.52 | 5.65 | 32.63 | 81.17 |
| 305 | 13.01 | 2.73 | 152.19 | 0.98 | 29.81 | 194.42 | 71.53 | 1.84 | 5.38 | 41.82 | 80.02 |
| 306 | 5.97 | 4.14 | 164.47 | 0.81 | 30.70 | 195.52 | 70.98 | 1.49 | 6.27 | 28.97 | 80.75 |
| 307 | 8.80 | 6.68 | 155.53 | 0.87 | 29.54 | 188.58 | 68.15 | 1.45 | 6.13 | 12.60 | 81.78 |
| 308 | 6.50 | 5.87 | 156.26 | 0.79 | 30.58 | 196.36 | 69.14 | 1.32 | 6.44 | 24.06 | 81.30 |
| 309 | 9.11 | 7.00 | 152.15 | 0.87 | 29.73 | 189.46 | 69.71 | 1.42 | 5.99 | 44.53 | 81.56 |
| 310 | 9.49 | 10.28 | 164.88 | 0.89 | 30.12 | 194.93 | 69.82 | 1.73 | 6.38 | 38.89 | 81.88 |
| 311 | 6.47 | 7.25 | 151.89 | 0.90 | 30.44 | 192.20 | 67.14 | 1.65 | 6.43 | 3.59 | 81.69 |
| 312 | 8.02 | 6.47 | 151.06 | 1.02 | 29.62 | 187.34 | 67.69 | 1.57 | 5.58 | 15.77 | 81.21 |
| 313 | 4.94 | 4.38 | 151.83 | 0.84 | 29.60 | 185.99 | 68.54 | 1.42 | 6.53 | 11.61 | 80.92 |
| 314 | 6.68 | 0.88 | 155.51 | 0.84 | 29.80 | 188.47 | 67.89 | 1.37 | 6.30 | 57.24 | 82.13 |
| 315 | 7.06 | 6.05 | 156.21 | 0.91 | 30.00 | 196.20 | 71.30 | 1.60 | 6.25 | 85.68 | 83.06 |
| 316 | 4.71 | 1.26 | 158.41 | 0.84 | 29.96 | 188.00 | 68.19 | 1.62 | 6.09 | 15.20 | 80.81 |
| 317 | 5.13 | 4.79 | 150.05 | 0.92 | 29.79 | 186.66 | 67.98 | 1.44 | 6.28 | 29.75 | 84.88 |
| 318 | 6.68 | 5.94 | 157.91 | 0.94 | 30.51 | 197.17 | 71.49 | 1.65 | 6.30 | 14.25 | 81.08 |
| 319 | 5.25 | 1.43 | 152.58 | 0.84 | 31.13 | 196.20 | 67.33 | 1.65 | 6.50 | 2.12 | 82.10 |
| 320 | 4.47 | 13.67 | 159.01 | 0.94 | 31.16 | 197.19 | 69.23 | 1.61 | 6.42 | 11.84 | 82.02 |
| 321 | 5.63 | 5.00 | 148.82 | 0.91 | 29.63 | 189.10 | 68.86 | 1.54 | 7.12 | 0.83 | 84.74 |
| 322 | 4.80 | 0.80 | 149.67 | 0.93 | 29.61 | 184.01 | 66.90 | 1.61 | 6.35 | 11.31 | 83.39 |
| 323 | 5.69 | 0.06 | 147.92 | 0.90 | 30.60 | 195.24 | 71.40 | 1.49 | 6.35 | 79.42 | 82.21 |
| 324 | 4.81 | 7.51 | 152.75 | 0.94 | 29.37 | 186.62 | 68.36 | 1.66 | 6.81 | 22.47 | 82.75 |
| 325 | 5.81 | 3.19 | 154.84 | 0.90 | 29.42 | 183.42 | 66.83 | 1.61 | 6.80 | 37.40 | 78.97 |
| 326 | 9.57 | 4.59 | 151.14 | 1.02 | 30.78 | 192.79 | 70.61 | 1.82 | 6.58 | 2.16 | 80.35 |
| 327 | 4.76 | 0.73 | 152.91 | 0.89 | 29.87 | 189.14 | 69.35 | 1.60 | 6.68 | 29.59 | 80.71 |
| 328 | 5.27 | 1.63 | 151.62 | 0.91 | 29.15 | 183.02 | 69.79 | 1.59 | 5.97 | 70.81 | 79.09 |

TABLE 1-continued

Example sample burning quality data collection values

| Sample | $x_1$ | $x_2$ | $x_3$ | $x_4$ | $x_5$ | $x_6$ | $x_7$ | $x_8$ | $x_9$ | $x_{10}$ | $x_{11}$ |
|---|---|---|---|---|---|---|---|---|---|---|---|
| 329 | 6.23 | 5.69 | 151.15 | 0.94 | 31.01 | 198.39 | 71.30 | 1.50 | 6.41 | 24.50 | 81.79 |
| 330 | 4.82 | 4.85 | 149.10 | 0.96 | 29.63 | 187.87 | 68.11 | 1.70 | 7.21 | 32.77 | 87.09 |
| 331 | 24.05 | 4.35 | 153.42 | 1.16 | 29.66 | 193.75 | 71.64 | 2.32 | 5.28 | 8.41 | 81.16 |
| 332 | 12.90 | 11.18 | 147.16 | 1.02 | 29.30 | 186.90 | 68.88 | 1.79 | 5.34 | 8.61 | 81.12 |
| 333 | 14.78 | 11.91 | 151.69 | 1.02 | 30.72 | 196.07 | 68.77 | 2.03 | 5.52 | 15.04 | 84.16 |
| 334 | 14.16 | 5.33 | 147.61 | 1.03 | 29.23 | 186.76 | 69.06 | 1.70 | 5.38 | 62.66 | 80.66 |
| 335 | 9.03 | 2.28 | 144.14 | 0.98 | 30.18 | 189.63 | 69.25 | 1.62 | 5.71 | 15.15 | 81.21 |
| 336 | 15.89 | 7.11 | 155.49 | 0.98 | 30.87 | 198.33 | 69.03 | 1.69 | 5.55 | 62.63 | 81.17 |
| 337 | 16.20 | 2.85 | 153.56 | 1.13 | 30.80 | 193.62 | 68.99 | 2.23 | 5.46 | 103.87 | 81.83 |
| 338 | 9.93 | 6.21 | 157.65 | 1.01 | 29.20 | 181.93 | 66.12 | 1.84 | 6.30 | 7.94 | 81.37 |
| 339 | 7.53 | 0.65 | 156.95 | 0.91 | 30.47 | 190.12 | 66.29 | 1.74 | 6.40 | 44.95 | 81.21 |
| 340 | 11.22 | 3.95 | 149.46 | 1.01 | 29.55 | 189.15 | 70.08 | 1.72 | 5.73 | 94.16 | 83.29 |
| 341 | 10.65 | 15.24 | 150.02 | 0.97 | 31.07 | 200.19 | 70.69 | 1.78 | 5.80 | 7.05 | 80.72 |
| 342 | 9.84 | 2.63 | 145.42 | 0.95 | 31.25 | 204.32 | 73.24 | 1.77 | 5.67 | 20.98 | 81.61 |
| 343 | 8.21 | 8.39 | 150.05 | 0.90 | 30.50 | 193.18 | 69.29 | 1.60 | 5.86 | 4.15 | 81.44 |
| 344 | 9.83 | 7.49 | 156.11 | 0.99 | 31.13 | 199.19 | 70.18 | 1.77 | 6.36 | 27.40 | 79.81 |
| 345 | 7.33 | 6.99 | 152.88 | 0.91 | 31.71 | 197.60 | 69.70 | 1.64 | 6.34 | 87.87 | 81.28 |
| 346 | 12.81 | 14.64 | 151.91 | 1.01 | 29.90 | 192.73 | 69.55 | 1.95 | 5.87 | 5.25 | 80.22 |
| 347 | 11.87 | 3.68 | 153.94 | 0.93 | 31.74 | 205.80 | 72.05 | 1.75 | 6.42 | 9.51 | 81.03 |
| 348 | 9.12 | 1.19 | 156.82 | 0.90 | 32.19 | 204.00 | 72.31 | 1.69 | 6.38 | 7.99 | 80.90 |
| 349 | 11.33 | 5.51 | 147.85 | 0.98 | 30.34 | 192.68 | 70.09 | 1.83 | 5.71 | 51.65 | 78.80 |
| 350 | 9.20 | 12.73 | 154.94 | 0.97 | 30.66 | 196.65 | 70.44 | 2.01 | 6.24 | 40.76 | 81.37 |
| 351 | 4.92 | 8.34 | 158.12 | 0.83 | 30.72 | 195.59 | 70.26 | 1.43 | 6.31 | 57.71 | 81.19 |
| 352 | 7.39 | 2.80 | 151.86 | 0.90 | 30.52 | 196.33 | 69.61 | 1.85 | 6.39 | 5.46 | 82.38 |
| 353 | 7.71 | 7.21 | 160.17 | 0.83 | 30.54 | 196.37 | 68.72 | 1.51 | 6.47 | 42.35 | 80.09 |
| 354 | 5.23 | 3.80 | 162.28 | 0.79 | 32.02 | 208.31 | 72.95 | 1.34 | 6.44 | 16.42 | 81.19 |
| 355 | 5.81 | 3.82 | 154.46 | 0.88 | 30.60 | 195.97 | 69.27 | 1.65 | 6.33 | 25.28 | 81.02 |
| 356 | 3.62 | 9.01 | 169.52 | 0.79 | 30.99 | 197.24 | 69.90 | 1.44 | 6.30 | 12.92 | 81.16 |
| 357 | 5.11 | 3.62 | 157.69 | 0.80 | 30.34 | 193.92 | 70.68 | 1.43 | 5.57 | 7.25 | 81.49 |
| 358 | 4.40 | 1.75 | 155.53 | 0.85 | 30.64 | 196.03 | 70.78 | 1.49 | 6.46 | 44.10 | 83.21 |
| 359 | 7.11 | 13.01 | 156.21 | 0.91 | 30.42 | 201.60 | 71.89 | 1.72 | 6.09 | 11.10 | 81.95 |
| 360 | 5.56 | 6.58 | 153.23 | 0.86 | 30.02 | 192.11 | 69.59 | 1.42 | 6.37 | 7.51 | 80.30 |
| 361 | 4.19 | 4.19 | 161.03 | 0.71 | 29.94 | 158.53 | 68.82 | 1.19 | 8.48 | 60.05 | 158.53 |
| 362 | 3.45 | 5.82 | 176.32 | 0.79 | 30.11 | 159.06 | 69.48 | 1.38 | 9.37 | 17.87 | 159.06 |
| 363 | 4.01 | 1.66 | 156.45 | 0.75 | 28.66 | 149.77 | 66.46 | 1.10 | 7.63 | 23.74 | 149.77 |
| 364 | 4.13 | 5.41 | 169.11 | 0.78 | 29.93 | 158.87 | 68.61 | 1.19 | 7.64 | 1.66 | 158.87 |
| 365 | 4.22 | 9.65 | 161.29 | 0.74 | 28.51 | 151.06 | 66.40 | 1.15 | 8.49 | 4.24 | 151.06 |
| 366 | 4.43 | 8.10 | 159.00 | 0.78 | 30.14 | 159.42 | 68.67 | 1.39 | 8.98 | 9.46 | 159.42 |
| 367 | 3.66 | 13.37 | 162.89 | 0.76 | 29.70 | 155.56 | 67.15 | 1.25 | 10.10 | 14.25 | 155.56 |
| 368 | 3.41 | 2.55 | 166.68 | 0.74 | 29.57 | 154.98 | 67.70 | 1.12 | 8.93 | 13.59 | 154.98 |
| 369 | 3.43 | 10.06 | 166.25 | 0.74 | 29.23 | 153.38 | 68.19 | 1.19 | 8.52 | 33.23 | 153.38 |
| 370 | 3.33 | 4.38 | 163.53 | 0.76 | 31.47 | 164.74 | 67.53 | 1.30 | 9.78 | 1.52 | 164.74 |
| 371 | 5.76 | 13.85 | 159.25 | 0.79 | 29.30 | 154.61 | 66.49 | 1.25 | 10.03 | 1.22 | 79.90 |
| 372 | 4.25 | 3.96 | 161.34 | 0.80 | 29.01 | 150.79 | 65.86 | 1.26 | 10.45 | 48.45 | 81.24 |
| 373 | 4.14 | 5.16 | 158.16 | 0.75 | 28.69 | 147.68 | 64.61 | 1.35 | 10.54 | 6.84 | 82.81 |
| 374 | 6.98 | 7.47 | 162.72 | 0.85 | 29.57 | 159.19 | 68.70 | 1.53 | 10.38 | 1.54 | 81.20 |
| 375 | 7.08 | 9.07 | 164.99 | 0.85 | 30.94 | 164.08 | 66.74 | 1.34 | 9.92 | 12.50 | 80.41 |
| 376 | 3.85 | 11.76 | 158.88 | 0.77 | 28.53 | 148.87 | 64.98 | 1.30 | 9.75 | 9.53 | 81.17 |
| 377 | 5.57 | 7.90 | 160.37 | 0.81 | 29.18 | 150.06 | 64.64 | 1.31 | 9.25 | 23.65 | 80.97 |
| 378 | 6.09 | 2.61 | 160.00 | 0.80 | 28.77 | 153.47 | 67.27 | 1.39 | 10.03 | 1.84 | 79.68 |
| 379 | 4.04 | 7.33 | 175.14 | 0.76 | 29.91 | 156.20 | 65.83 | 1.32 | 9.53 | 25.49 | 81.55 |
| 380 | 4.42 | 5.98 | 156.23 | 0.81 | 29.11 | 154.92 | 67.02 | 1.33 | 9.64 | 25.56 | 83.01 |
| 381 | 3.15 | 9.72 | 164.98 | 0.77 | 28.74 | 150.01 | 65.80 | 1.42 | 9.64 | 24.55 | 82.81 |
| 382 | 5.89 | 3.90 | 162.60 | 0.79 | 29.47 | 154.06 | 66.70 | 1.39 | 8.20 | 0.00 | 80.82 |
| 383 | 3.73 | 5.86 | 168.39 | 0.78 | 29.42 | 152.34 | 65.61 | 1.36 | 9.40 | 1.82 | 80.60 |
| 384 | 4.97 | 2.29 | 159.54 | 0.90 | 29.25 | 151.52 | 66.31 | 1.69 | 8.64 | 26.96 | 80.80 |
| 385 | 2.96 | 6.38 | 167.22 | 0.74 | 28.91 | 149.66 | 65.18 | 1.29 | 9.25 | 0.46 | 81.09 |
| 386 | 7.97 | 6.93 | 160.20 | 0.81 | 28.84 | 155.34 | 67.94 | 1.42 | 9.48 | 0.90 | 80.60 |
| 387 | 3.65 | 7.71 | 165.00 | 0.74 | 28.92 | 149.51 | 64.62 | 1.21 | 9.21 | 0.28 | 77.13 |
| 388 | 3.73 | 8.51 | 167.72 | 0.79 | 30.50 | 159.85 | 66.27 | 1.44 | 9.71 | 1.59 | 81.12 |
| 389 | 4.20 | 2.38 | 164.21 | 0.75 | 29.23 | 152.31 | 66.61 | 1.61 | 10.47 | 1.27 | 81.32 |
| 390 | 5.00 | 7.11 | 162.27 | 0.80 | 28.82 | 151.46 | 66.09 | 1.34 | 9.50 | 1.84 | 81.10 |

S2. Filtering cigarette burning quality index data. The isolation forest method is used to find samples that are sparsely distributed and far away from high-density groups (e.g., anomalous). A random segmentation strategy is used to control a path length that different samples undergo when they are isolated, thereby identifying outlier singular points (e.g., anomalous data).

A subsample isolated tree is established. Each node of the tree is a leaf node or an intermediate node with two sub-nodes. One or more (preferably, a plurality, up to 11) cigarette burning quality indices or indicators are randomly selected, and the corresponding data values split. Splits to $X_{og}$ are performed recursively. For each split or implementation thereof, samples smaller than the split value are assigned to a left sub-node (e.g., of the subsample isolated tree), and samples larger than the split value are assigned to a right sub-node (e.g., of the subsample isolated tree). The isolation tree is constructed until all samples are isolated or the tree reaches a specified height. The number of sub-samples $\psi$ and tree height $h_t$ may satisfy the following relationship:

$$h_t = \text{ceiling}(\log_2(\psi))$$

where $h_t$ is the smallest integer value greater than or equal to $\log_2(\psi)$, which is approximately the average path length of the tree:

$$c(m) = 2H(m-1) - \frac{2(m-1)}{m}$$

where m is the number of samples, c(m) is the average path length of the tree (that is, the average height of the tree), and H(m−1) is a harmonic number (e.g., of the tree). The estimated value of the harmonic number is $\ln(m-1)+0.577$. The number of sub-samples $\psi$ is 256.

An isolated forest is constructed, which contains the number of isolated trees $c_t$. The test sample is passed through each isolated tree in the isolated forest, and an anomaly score of each test sample can be obtained. The anomaly score of the test sample x is calculated according to the following formula:

$$s(x, m) = 2^{-\frac{E(h(x))}{c(m)}};$$

where h(x) is the path length of the sample x, E(h(x)) is the expectation of h(x), and the anomaly score range of the test sample is (0,1). The smaller the path length h(x) of the test sample is, the closer the anomaly score is to 1, and the higher the singularity probability is. The larger the path length h(x) is, the closer the anomaly score is to 0, and the lower the singularity probability is. The retained data after removing the singular (e.g., anomalous) samples is denoted as:

$$X_{norm} = (x_{1norm}, x_{2norm}, \ldots, x_{11norm}).$$

Since the isolation forest method divides data randomly, the results of different dividing operations are different. By repeatedly training and predicting data and/or results from 390 samples 5 times, the number of times each sample is detected as a singular (or anomalous) point can be obtained, as shown in Table 2 below. It is known from the five repeated detection results that 29 of the 390 samples were determined to be singular (or anomalous) points five times. Thus, these 29 samples may be eliminated.

TABLE 2

| Number of times sample collection data is detected as singular points | | | | | | |
|---|---|---|---|---|---|---|
| Detected times | 5 | 4 | 3 | 2 | 1 | 0 |
| Samples | 29 | 11 | 12 | 11 | 7 | 320 |

S3. Standardizing cigarette data to eliminate the dimensional differences of different burning quality indicators. The cigarette burning quality indicators are divided into positive indicators and negative indicators. Positive indicators include ash column grayscale value, ash column length, ash column area, and ash retention rate. Negative indicators include crack rate, ash column deviation, and fly ash value, charcoal line width, charcoal line uniformity and burning speed.

Standardization is achieved through a two-way range, and the positive indicators are processed as follows:

$$x_i = \frac{x_{inorm} - \min(x_{inorm})}{\max(x_{inorm}) - \min(x_{inorm})}, i = 1, 2, \ldots, 11$$

The negative indicators are processed as follows:

$$x_i = \frac{\max(x_{inorm}) - x_{inorm}}{\max(x_{inorm}) - \min(x_{inorm})}, i = 1, 2, \ldots, 11$$

where $X = (x_1, x_2, \ldots, x_{11})$ is the standard cigarette burning quality data, and $\max(x_{inorm})$ and $\min(x_{inorm})$ are respectively the maximum and minimum values of each indicator of the retained data after removing singular or anomalous samples in step S2.

Taking Sample 1 as an example, the index data before and after standardization are shown in Table 3 below:

TABLE 3

Examples of sample data before and after standardization

| Before | $x_{1norm}$ | $x_{2norm}$ | $x_{3norm}$ | $x_{4norm}$ | $x_{5norm}$ | $x_{6norm}$ | $x_{7norm}$ | $x_{8norm}$ | $x_{9norm}$ | $x_{10norm}$ | $x_{11norm}$ |
|---|---|---|---|---|---|---|---|---|---|---|---|
| | 8.40 | 20.03 | 142.36 | 0.95 | 30.38 | 190.97 | 70.43 | 1.67 | 5.33 | 3.94 | 81.50 |
| After | $x_1$ | $x_2$ | $x_3$ | $x_4$ | $x_5$ | $x_6$ | $x_7$ | $x_8$ | $x_9$ | $x_{10}$ | $x_{11}$ |
| | 0.33 | 0.84 | 0.24 | 0.53 | 0.46 | 0.69 | 0.49 | 0.43 | 0.11 | 0.03 | 0.12 |

S4. Measuring comprehensive cigarette burning quality: combining the grayscale correlation, the Euclidean distance, the city block distance and the cosine similarity data or analysis to obtain a complete quantitative result of the burning quality indices, their measurement, and optionally their importance. The grayscale correlation, the Euclidean distance, the city block distance and the cosine similarity may be sample performance correlation analyses.

Gray correlation analysis measures the correlation between each indicator and sample performance through the similarity of the development trends of different indicators. The gray correlation coefficient X between the cigarette burning quality index and the cigarette sample performance reference column is:

$$\zeta i(k) = \frac{\min_s \min_t |x_0(t) - x_s(t)| + \rho \max_s \max_t |x_0(t) - x_s(t)|}{|x_0(k) - x_i(k)| + \rho \max_s \max_t |x_0(t) - x_d(t)|}$$

Among them, $\zeta i(k)$ is the gray correlation coefficient, $\rho$ is the resolution coefficient, used to weaken the excessive impact of the maximum value on the correlation coefficient, where $\rho = 0.5$;

$$\min_s \min_t |x_0(t) - x_s(t)|$$

is the two-level minimum difference, and $$\max_s \max_t |x_0 o(t) - x_s(t)|$$

is the two-level maximum difference. The gray correlation value of the evaluation sample and performance reference column is obtained by:

$$d_r = \frac{1}{n} \sum_{k=1}^{n} \zeta_i(k)$$

In this example, the grayscale correlation results between the cigarette burning quality index and the performance reference column are as shown in Table 4 below:

TABLE 4

Burning Quality Grayscale Correlation Measurement

| Index name | grayscale correlation |
| --- | --- |
| Crack rate | 0.8956 |
| Ash column deviation | 0.8903 |
| Fly ash value | 0.8887 |
| Ash retention rate | 0.8806 |
| Charcoal line uniformity | 0.8727 |
| Charcoal line width | 0.8691 |
| Burning speed | 0.8523 |
| Ash column grayscale | 0.8123 |
| Ash column length | 0.7877 |
| Ash column area | 0.7869 |
| Ash Shrinkage rate | 0.7752 |

Distance correlation is measured on an invariant scale by the Euclidean distance. The Euclidean distance between the cigarette burning quality index and the cigarette sample performance reference column is:

$$d_e = \sqrt{\sum_{i=1}^{n} (x_i - x_0)^2}$$

In this example, the Euclidean distance between the cigarette burning quality index and the performance reference column is shown in Table 5 below:

TABLE 5

Example Burning Quality Euclidean Distance Measurement

| Index name | Euclidean Distance |
| --- | --- |
| Fly ash value | 13.90 |
| Ash retention rate | 14.56 |
| Crack rate | 15.54 |
| Ash column deviation | 15.99 |
| Burning speed | 16.95 |
| Ash column grayscale | 17.89 |
| Charcoal line uniformity | 17.97 |
| Charcoal line width | 18.93 |
| Ash column length | 21.59 |
| Ash shrinkage rate | 22.46 |
| Ash column area | 24.30 |

The degree of distance correlation may be measured using a city block distance based on dimensions. The city block distance between the cigarette burning quality index and the cigarette sample performance reference column is:

$$d_c = \sum_{i=1}^{n} |x_i - x_0|$$

In this example, the city block distance between the cigarette burning quality index and the performance reference column is as shown in Table 6 below:

TABLE 6

Example Burning Quality City Block Distance Metric

| Index names | City Block Distance |
| --- | --- |
| Ash retention rate | 245.20 |
| Fly ash value | 250.07 |
| Crack rate | 286.78 |
| Ash column deviation | 297.61 |
| Burning speed | 300.39 |
| Ash column grayscale | 311.65 |
| Charcoal line uniformity | 335.69 |
| Charcoal line width | 356.96 |
| Ash column length | 403.29 |
| Ash shrinkage rate | 422.23 |
| Ash column area | 461.38 |

Starting from the angle between vectors in multi-dimensional space, the degree of directional correlation is reflected using cosine similarity. The cosine similarity between the cigarette burning quality index and the cigarette sample performance reference column is:

$$d_{cos} = 1 - \frac{X \cdot x_0}{\|X\| \times \|x_0\|} = 1 - \frac{\sum_{i=1}^{n} x_i \times x_0}{\sqrt{\sum_{i=1}^{n} x_i^2} \times \sqrt{\sum_{i=1}^{n} x_0^2}}$$

In the embodiment, the cosine similarity between the cigarette burning quality index and the performance reference column is shown in Table 7 below:

TABLE 7

Embodiment Burning Quality Cosine Similarity Measurement

| Index name | Cosine Similarity |
| --- | --- |
| Crack rate | 0.020 |
| Fly ash value | 0.022 |
| Ash column deviation | 0.022 |
| Charcoal line uniformity | 0.030 |
| Charcoal line width | 0.030 |
| Ash retention rate | 0.049 |
| Burning speed | 0.057 |
| Ash column grayscale | 0.081 |
| Ash column length | 0.096 |
| Ash shrinkage rate | 0.112 |
| Ash column area | 0.148 |

The above burning quality indicators and sample performance correlation analyses are measured from different starting points, and they are irreplaceable for each other. The four metrics are combined according to the following formula:

$$d = \frac{d_r - \min(d_r)}{(\max(d_r) - \min(d_r))} + \sum_{i=1}^{2} \frac{\frac{1}{d_i} - \min\left(\frac{1}{d_i}\right)}{2\left(\max\left(\frac{1}{d_i}\right) - \min\left(\frac{1}{d_i}\right)\right)} + \frac{\frac{1}{d_{cos}} - \min\left(\frac{1}{d_{cos}}\right)}{\left(\max\left(\frac{1}{d_{cos}}\right) - \min\left(\frac{1}{d_{cos}}\right)\right)}$$

Among them, d is the comprehensive measure, $d_r$ is the gray correlation degree; when i=1, 2, $d_1$ and $d_2$ represent the Euclidean distance and city block distance respectively, and $d_{cos}$ represents the cosine similarity. One can calculate the comprehensive measure of each indicator and/or correlation analysis, and obtain an importance or ranking of the corresponding cigarette burning quality indicators. According to the comprehensively measured value, one can determine a weight for various ones of the cigarette burning quality indicators.

In the example herein, the comprehensive relationship measure between the cigarette burning quality indices and the performance reference column(s) is as shown in Table 8 below:

TABLE 8

Comprehensive Measurement of Burning Quality

| Index names | Comprehensive Measurement |
| --- | --- |
| Fly ash value | 3.805 |
| Crack rate | 3.444 |
| Ash column deviation | 3.175 |
| Ash retention rate | 3.097 |
| Charcoal line uniformity | 2.331 |
| Charcoal line width | 2.111 |
| Burning speed | 2.087 |
| Ash column grayscale | 1.462 |
| Ash column length | 0.522 |
| Ash shrinkage rate | 0.267 |
| Ash column area | 0.097 |

The importance of the cigarette burning quality indicators from high to low is obtained as follows: fly ash value, crack rate, ash column deviation, ash retention rate, charcoal line uniformity, charcoal line width, burning speed, ash column gray level, ash column length, ash shrinkage rate and ash column area. The specific weight of the indicator can be expressed by the comprehensive measurement value in Table 8.

What is claimed is:

1. A method for comprehensively analyzing and/or evaluating cigarette burning quality indicators, comprising:
    while simulating smoking using a robot under predefined environmental simulation conditions, capturing real-time status of combusting cigarettes using a plurality of cameras at different angles for the cigarette burning quality indicators, where the cigarette burning quality indicators include a crack rate, an ash column deviation, an ash column gray level, an ash column length, an ash column area, an ash shrinkage rate, a fly ash value, an ash retention rate, a charcoal line width, a charcoal line uniformity and a burning speed, the robot comprises a robotic arm that simulates an entire process of human cigarette smoking to capture the data of the cigarette burning quality indicators for the combusting cigarettes in real time using a camera system comprising the plurality of cameras to collect external attributes of the combusting cigarettes, and the plurality of cameras comprises a plurality of smart cameras with a resolution of 1600*1200 dots per square inch or higher and a frame rate of 50 frames per second or above;
    establishing a subsample isolated tree, wherein the subsample isolated tree includes a subsample number and a tree height satisfying:

$h_t = \text{ceiling}(\log_2(\psi))$ where $h_t$ is the smallest integer value greater than or equal to $\log_2(\psi)$, which is approximately an average path length of the subsample isolated tree:

$c(m) = 2H(m-1) - \frac{2(m-1)}{m};$ where $\psi$ is the subsample number, m is a number of samples, c(m) is the average path length or an average height of the subsample isolated tree, and H(m−1) is a harmonic number;
    constructing an isolated forest containing a number of the subsample isolated trees $c_t$;
    passing the samples through each of the subsample isolated trees in the isolated forest to obtain an anomaly score of each sample, where the anomaly score of an individual sample x is calculated according to:

$$s(x, m) = 2^{-\frac{E(h(x))}{c(m)}}$$

where h(x) is a path length of the sample x, E(h(x)) is an expectation of h(x), and an anomaly score range of the sample is (0,1);

removing ones of the samples having an anomaly score above a predetermined threshold, and denoting data after removing the ones of the samples as $X_{norm} = (x_{1norm}, x_{2norm}, \ldots, x_{11norm})$;

dividing the cigarette burning quality indicators into positive indicators and negative indicators;

processing the positive indicators as follows:

$$x_i = \frac{x_{inorm} - \min(x_{inorm})}{\max(x_{inorm}) - \min(x_{inorm})}, i = 1, 2, \ldots, 11;$$

processing the negative indicators as follows $$x_i = \frac{\max(x_{inorm}) - x_{inorm}}{\max(x_{inorm}) - \min(x_{inorm})}, i = 1, 2, \ldots, 11;$$

where $X = (x_1, x_2, \ldots, x_{11})$ is standardized cigarette burning quality data, and $\max(x_{inorm})$ and $\min(x_{inorm})$ are respectively maximum and minimum values of each indicator in the data after removing the ones of the samples;

combining a grayscale correlation, a Euclidean distance, a city block distance and a cosine similarity of the data after removing the ones of the samples, wherein a grayscale correlation coefficient X between each of the cigarette burning quality indices and the corresponding data after removing the ones of the samples is:

$$\zeta i(k) = \frac{\min_s \min_t |x_0(t) - x_s(t)| + \rho \max_s \max_t |x_0(t) - x_s(t)|}{|x_0(k) - x_i(k)| + \rho \max_s \max_t |x_0(t) - x_s(t)|};$$

where $\zeta i(k)$ is the grayscale correlation coefficient, $\rho$ is a resolution coefficient, $$\min_s \min_t |x_0(t) - x_s(t)|$$

is a two-level minimum difference, $$\min_s \min_t |x_0(t) - x_s(t)|$$

is a two-level maximum difference, and obtaining a grayscale correlation value of the data after removing the ones of the samples and a corresponding cigarette sample performance reference column according to:

$$d_r = \frac{1}{n} \sum_{k=1}^{n} \zeta_i(k);$$

the Euclidean distance between a cigarette burning quality index and the corresponding cigarette sample performance reference column is:

$$d_e = \sqrt{\sum_{i=1}^{n}(x_i - x_0)^2};$$

the city block distance between the cigarette burning quality index and the corresponding cigarette sample performance reference column is:

$$d_c = \sum_{i=1}^{n} |x_i - x_0|;$$

and the cosine similarity between the cigarette burning quality index and the corresponding cigarette sample performance reference column is:

$$d_{cos} = 1 - \frac{X \cdot x_0}{\|X\| \times \|x_0\|} = 1 - \frac{\sum_{i=1}^{n} x_i \times x_0}{\sqrt{\sum_{i=1}^{n} x_i^2} \times \sqrt{\sum_{i=1}^{n} x_0^2}};$$

and combining the grayscale correlation, the Euclidean distance, the city block distance and the cosine similarity according to:

$$d = \frac{d_r - \min(d_r)}{(\max(d_r) - \min(d_r))} + \sum_{i=1}^{2} \frac{\frac{1}{d_i} - \min\left(\frac{1}{d_i}\right)}{2\left(\max\left(\frac{1}{d_i}\right) - \min\left(\frac{1}{d_i}\right)\right)} + \frac{\frac{1}{d_{cos}} - \min\left(\frac{1}{d_{cos}}\right)}{\left(\max\left(\frac{1}{d_{cos}}\right) - \min\left(\frac{1}{d_{cos}}\right)\right)};$$

where d is a comprehensive measure, $d_r$ is a grayscale correlation degree; when i=1, 2, $d_1$ and $d_2$ represent the Euclidean distance and city block distance respectively, and $d_{cos}$ represents the cosine similarity.

2. The method according to claim 1, wherein the subsample number $\psi$ is 256.

3. The method according to claim 1, wherein $c_t = 100$.

4. The method according to claim 1, further comprising measuring the cigarette burning quality indicators using a plurality of correlation examination methods from the different angles.

5. The method according to claim 1, wherein simulating arm and wrist movements of smokers when smoking using a plurality of multi-axis industrial manipulators configured to clamp or hold the cigarettes.

6. The method according to claim 5, wherein the plurality of multi-axis industrial manipulators have an adjustable movement speed and angle.

7. The method according to claim 1, wherein the positive indicators include the ash column grayscale, the ash column length, the ash column area, and the ash retention rate, and the negative indicators include the crack rate, the ash column deviation, the fly ash value, the charcoal line width, the charcoal line uniformity and the burning speed.

8. The method according to claim 1, wherein simulating smoking further uses a suction or vacuum device.

9. The method according to claim 8, wherein the suction or vacuum device has an adjustable suction mode, an adjustable suction time, an adjustable suction volume, and an adjustable suction interval.

* * * * *